United States Patent
Kroupa et al.

(10) Patent No.: US 10,019,153 B2
(45) Date of Patent: Jul. 10, 2018

(54) SCRAPBOOKING DIGITAL CONTENT IN COMPUTING DEVICES USING A SWIPING GESTURE

(71) Applicant: Nook Digital, LLC, New York, NY (US)

(72) Inventors: Brandon Kroupa, San Francisco, CA (US); Stephane Maes, Mountain View, CA (US); Jaireh Tecarro, San Francisco, CA (US); Chen-Je Huang, Menlo Park, CA (US)

(73) Assignee: Nook Digital, LLC, New York, NY (US)

( * ) Notice: Subject to any disclaimer, the term of this patent is extended or adjusted under 35 U.S.C. 154(b) by 306 days.

(21) Appl. No.: 13/912,972

(22) Filed: Jun. 7, 2013

(65) Prior Publication Data
US 2014/0365851 A1 Dec. 11, 2014

(51) Int. Cl.
*G06F 17/22* (2006.01)
*G06F 3/0482* (2013.01)
(Continued)

(52) U.S. Cl.
CPC ........ *G06F 3/04883* (2013.01); *G06F 3/0483* (2013.01); *G06F 17/2229* (2013.01); *G06F 17/241* (2013.01)

(58) Field of Classification Search
CPC ............. G06F 17/2229; G06F 3/04883; G06F 17/241; G06F 3/0483
See application file for complete search history.

(56) References Cited

U.S. PATENT DOCUMENTS 4,896,543 A 1/1990 Gullman
5,598,524 A * 1/1997 Johnston, Jr. ......... G06F 3/0486
715/769
(Continued)

FOREIGN PATENT DOCUMENTS

EP 0722150 A1 7/1996

OTHER PUBLICATIONS

Adam Dachis, "Open Spring-Loaded Folders in an Instant with the Spacebar", Dec. 5, 2011, article and embedded video, contents and screenshots of video are provided, retrieved from https://lifehacker.com/5865192/open-spring-loaded-folders-in-an-instant-with-the-spacebar on Sep. 19, 2017.*
(Continued)

*Primary Examiner* — Cesar Paula
*Assistant Examiner* — Konrad Kulikowski
(74) *Attorney, Agent, or Firm* — Finch & Maloney PLLC

(57) ABSTRACT

Techniques are disclosed for providing a scrapbooking function in electronic computing devices. The user can engage the scrapbooking function with a content sampling command that engages a scrapbook creation mode which virtually rips a digital content sample from a content source. The digital content sample may be displayed to the user with a torn edge, as if it had been physically torn from a magazine or catalogue. The content sampling command may be, for example, a swipe gesture, an S-gesture, or selecting a scrapbook UI control feature. The user may save the sampled content into a new scrapbook or save it to an existing scrapbook. The user may also engage the scrapbooking function by entering a scrapbook viewing mode which allows the user to view and edit existing scrapbooks. The content sample may include all encrypted data present in the digital content from which it is sampled.

20 Claims, 16 Drawing Sheets

(51) Int. Cl.
*G06F 3/0483* (2013.01)
*G06F 3/0488* (2013.01)
*G06F 17/24* (2006.01)

(56) References Cited

U.S. PATENT DOCUMENTS

| | | | |
|---|---|---|---|
| 5,633,471 | A | 5/1997 | Fukushima |
| 5,844,557 | A | 12/1998 | Shively, II |
| 5,960,448 | A * | 9/1999 | Reichek et al. .............. 715/236 |
| 6,259,438 | B1 | 6/2001 | Fleck et al. |
| 6,956,564 | B1 | 10/2005 | Williams |
| 7,649,524 | B2 | 1/2010 | Haim et al. |
| 7,840,912 | B2 | 11/2010 | Elias et al. |
| 7,898,541 | B2 | 3/2011 | Hong et al. |
| RE42,738 | E | 9/2011 | Williams |
| 8,059,101 | B2 | 11/2011 | Westerman et al. |
| 8,239,413 | B2 | 8/2012 | Hubert |
| 8,274,536 | B2 | 9/2012 | Chaudhri et al. |
| 8,286,104 | B1 | 10/2012 | Yonge-Mallo |
| D670,713 | S | 11/2012 | Cranfill et al. |
| RE44,103 | E | 3/2013 | Williams |
| 8,400,417 | B2 | 3/2013 | Ording et al. |
| 8,508,494 | B2 | 8/2013 | Moore |
| 2001/0025289 | A1 | 9/2001 | Jenkins et al. |
| 2002/0116421 | A1 | 8/2002 | Fox et al. |
| 2006/0075353 | A1* | 4/2006 | DeSpain et al. .............. 715/770 |
| 2006/0277482 | A1* | 12/2006 | Hoffman ............... G06F 17/241 715/764 |
| 2007/0047002 | A1 | 3/2007 | Hull et al. |
| 2008/0036747 | A1 | 2/2008 | Hope |
| 2008/0307308 | A1* | 12/2008 | Sullivan et al. .............. 715/723 |
| 2010/0100854 | A1 | 4/2010 | Russell et al. |
| 2010/0192086 | A1 | 7/2010 | Kocienda et al. |
| 2010/0229130 | A1 | 9/2010 | Edge et al. |
| 2010/0259482 | A1 | 10/2010 | Ball |
| 2010/0262659 | A1 | 10/2010 | Christiansen et al. |
| 2010/0318895 | A1 | 12/2010 | Steinberger et al. |
| 2011/0258542 | A1 | 10/2011 | Kenney et al. |
| 2012/0056821 | A1 | 3/2012 | Goh |
| 2012/0127110 | A1 | 5/2012 | Amm et al. |
| 2012/0139879 | A1 | 6/2012 | Kim et al. |
| 2012/0221938 | A1 | 8/2012 | Patterson et al. |
| 2012/0235901 | A1 | 9/2012 | Binder |
| 2012/0242579 | A1 | 9/2012 | Chua |
| 2012/0242584 | A1 | 9/2012 | Tuli |
| 2012/0249768 | A1 | 10/2012 | Binder |
| 2012/0280947 | A1 | 11/2012 | Weaver et al. |
| 2012/0311438 | A1 | 12/2012 | Cranfill et al. |
| 2012/0311509 | A1* | 12/2012 | Maggiotto .......... G06F 3/04817 715/863 |
| 2012/0329529 | A1 | 12/2012 | van der Raadt |
| 2013/0016045 | A1 | 1/2013 | Zhao et al. |
| 2013/0024519 | A1* | 1/2013 | Herman et al. .............. 709/204 |
| 2013/0036383 | A1 | 2/2013 | Yuan et al. |
| 2013/0063364 | A1 | 3/2013 | Moore |
| 2013/0076632 | A1 | 3/2013 | Sirpal et al. |
| 2013/0076637 | A1 | 3/2013 | Teltz |
| 2013/0076638 | A1 | 3/2013 | Sirpal et al. |
| 2013/0076781 | A1 | 3/2013 | Sirpal et al. |
| 2013/0113699 | A1 | 5/2013 | Lim |
| 2013/0120271 | A1 | 5/2013 | Lee et al. |
| 2013/0135234 | A1 | 5/2013 | Hisano et al. |
| 2013/0139078 | A1 | 5/2013 | Chuang et al. |
| 2013/0139107 | A1 | 5/2013 | Jung |
| 2013/0162532 | A1 | 6/2013 | Cheng et al. |
| 2013/0185680 | A1 | 7/2013 | Chaudhri et al. |
| 2013/0194308 | A1 | 8/2013 | Privault et al. |

OTHER PUBLICATIONS

William Pearson (hereinafter Pearson, "How to Disable Finder Icon Thumbnails and Previews for Images & Video Files", Jan. 10, 2013, , retrieved from http://osxdaily.com/2013/01/10/disable-finder-icon-thumbnails-previews-mac-os-x/ on Sep. 27, 2017).*

"Adonit Jot Touch (for iPad)," Adonit Jot Touch (for iPad) Review & Rating—PCMag.com; http://www.pcnnag.com/article2/0,2817,2411192,00.asp; 6pages, printed from the Internet on Jun. 20, 2013.

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

(56) References Cited

OTHER PUBLICATIONS

"Padblue 2," BRANDO—mobile.brando.com, http://mobile.brando.com/Padblue-2_p9162c1577d94.html., 4 pages, printed from the Internet on May 10, 2013.
Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.
"Bluetooth 4.0 SmartPen The future just got a little brighter," Pogo Connect, http://tenonedesign.com/connect.php, 7 pages, printed from the Internet on Jun. 20, 2013.
Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.
Rigg, Jamie, "Sony tries to patent stylus with friction-based haptic feedback," posted on Nov 22, 2012 at 9:50 AM, http://www.engadget.com/2012/11/22/sony-haptic-feedback-stylus-patent/, 2 pages, printed from the Internet on Jun. 20, 2013.
"Stylus Hanging Bluetooth Headset," BRANDO—mobile.brando.com, http://mobile.brando.com/prod_detail.php?prod_id=03291, 4 pages, printed from the Internet on May 10, 2013.
"The JukeStyle is a great budget stylus for your iOS devices," stylus Archives—iPad News, http://www.ipadnews.nl/tag/stylus/, 44 pages, printed from the Internet on Jun. 20, 2013.
Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.
Bragdon, et al., "Experimental Analysis of Touch-Screen Gesture Designs in Mobile Environments", Proceedings of the SIGCHI Conference on Human Factors in Computing Systems, pp. 403-412 (2011).
"Gesture Search for Google Mobile", Google Mobile, www.google.com/mobile/gesture-search, 1 page, printed from the Internet on Dec. 26, 2012.
"Comics by comiXology," Comic Book Reader Guide, http://www.comicbookreaderguide.com/comics-by-comixology/, 24 pages, printed from the Internet on May 6, 2013.
"NFC Forum: Frequently Asked Questions," http://www.nfc-forum.org/resources/faqs#acknowledge, 11 pages, printed from the Internet on Feb. 18, 2013.
"How to Remote Wipe an iPhone or iPad," OSXDaily, http://osxdaily.com/2012/06/05/remote-wipe-iphone-or-ipad/, 4 pages, printed from the Internet on Feb. 2, 2013.
"Screen hotspot," Wikipedia, the free encyclopedia, http://en.wikipedia.org/wiki/Screen_hotspot, 1 page, printed from the Internet on May 15, 2013.
"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.
Kanai, et al., "Intra-Rendition Navigation," Copyright 2012-2013 International Digital Publishing Forum (IDPF), 13 pages.
"Explaining how the sPen tech works (and is very diff than other styluses)," http://forum.xda-developers.com/showthread.php?t=, 1 page, printed from the Internet on Jan. 15, 2013.

\* cited by examiner

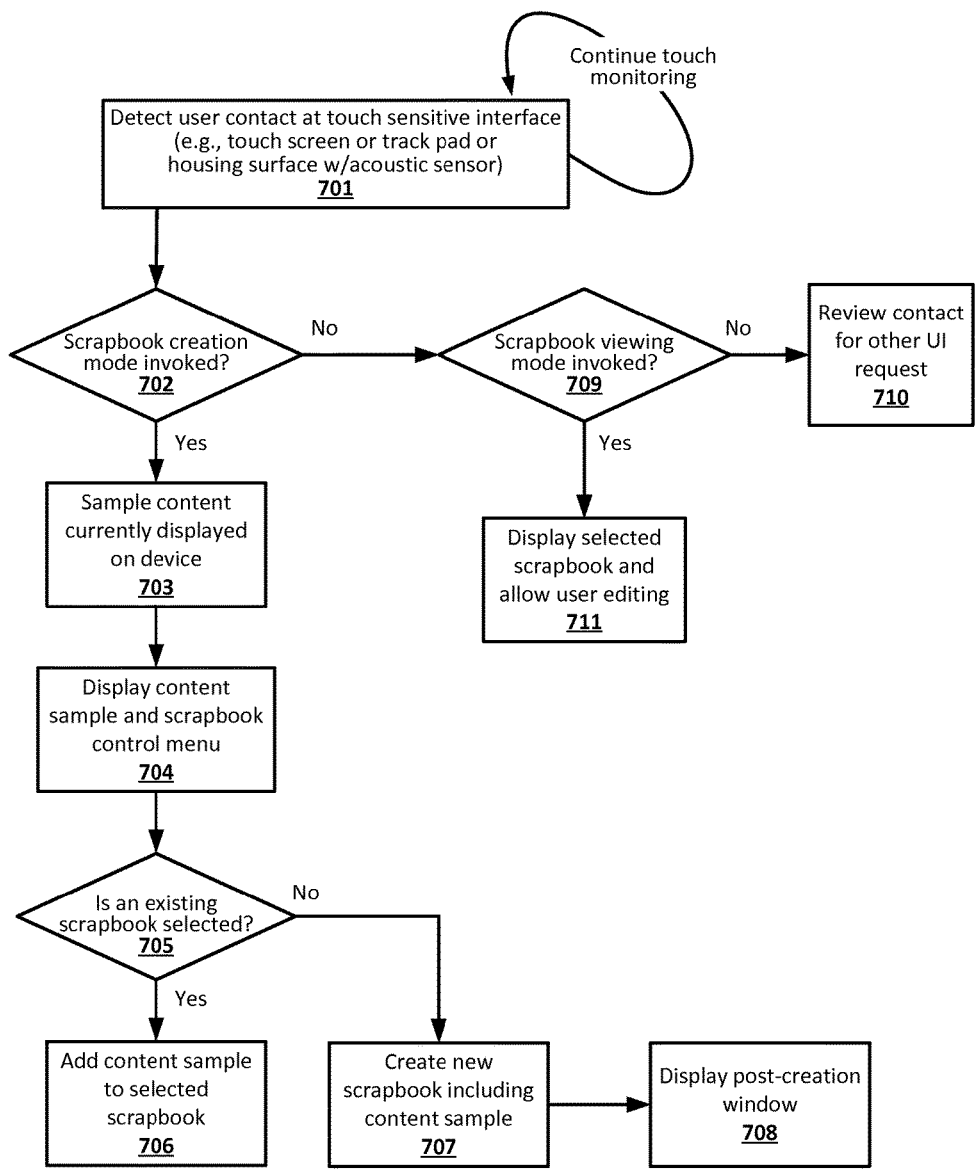

SCRAPBOOKING DIGITAL CONTENT IN COMPUTING DEVICES USING A SWIPING GESTURE

FIELD OF THE DISCLOSURE

This disclosure relates to electronic display devices, and more particularly, to user interface (UI) techniques for interacting with computing devices.

BACKGROUND

Electronic display devices such as tablets, eReaders, mobile phones, smart phones, personal digital assistants (PDAs), and other such touch screen electronic display devices are commonly used for displaying consumable content. The content may be, for example, an eBook, an online article or blog, images, a movie or video, a map, just to name a few types. Such display devices are also useful for displaying a user interface that allows a user to interact with an application running on the device. The user interface may include, for example, one or more touch screen controls and/or one or more displayed labels that correspond to nearby hardware buttons. The touch screen display may be backlit or not, and may be implemented for instance with an LED screen or an electrophoretic display. Such devices may also include other touch sensitive surfaces, such as a track pad (e.g., capacitive or resistive touch sensor) or touch sensitive housing (e.g., acoustic sensor).

BRIEF DESCRIPTION OF THE DRAWINGS

FIG. 7 illustrates a method for providing a scrapbook function in an electronic touch screen device, in accordance with an embodiment of the present invention.

DETAILED DESCRIPTION

Figure 1A:
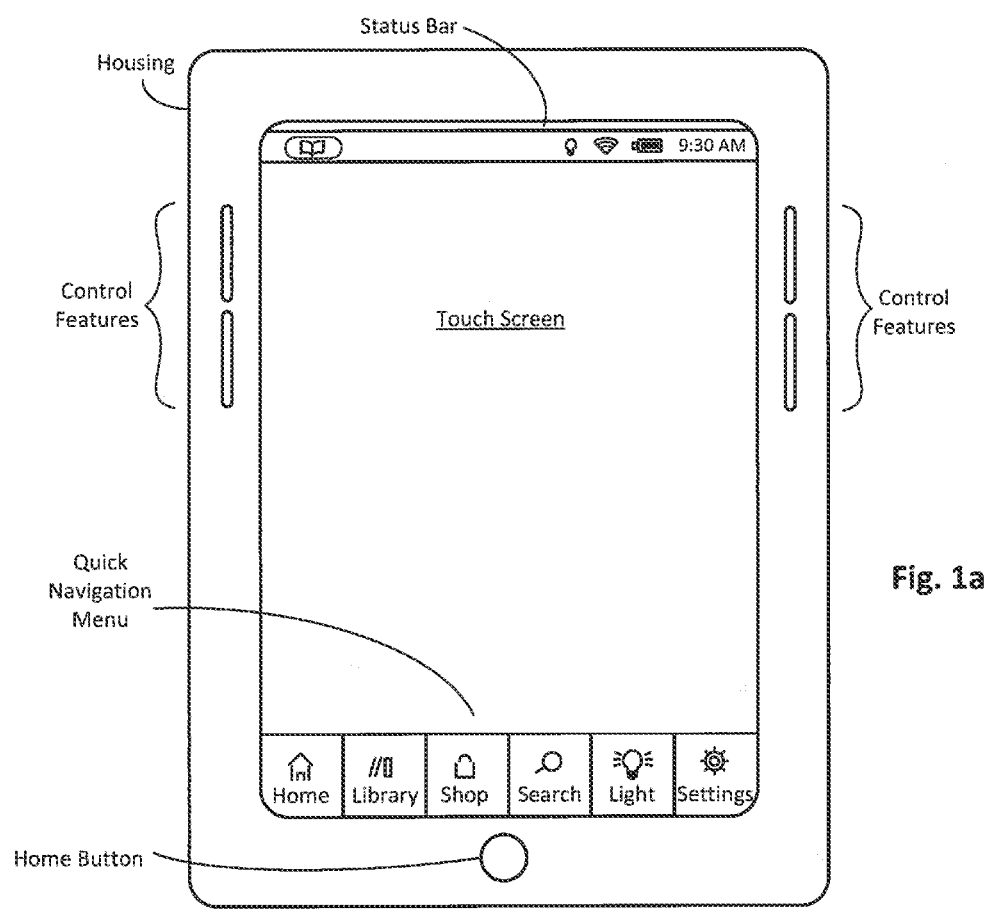
FIGS. 1a-b illustrate an example electronic touch screen device having a scrapbook function configured in accordance with an embodiment of the present invention.

Techniques are disclosed for providing a scrapbooking function in electronic computing devices, such as a touch screen device. The user can engage the scrapbooking function with a content sampling command that engages a scrapbook creation mode. The scrapbook creation mode may virtually rip a digital content sample from a content source and display that sample to the user along with a scrapbook control menu. The digital content sample may be displayed to the user with a torn edge, as if it had been physically torn from a magazine or catalogue. The content sample may include all encrypted and/or embedded data (e.g., rich media such as audio/video and any metadata such as content universal ID code and hyperlink to original content source) present in the digital content from which it is sampled. In some embodiments, the digital content sample may toggle between encrypted and unencrypted content and may prompt for the appropriate credentials if not already there. The content sampling command may be, for example, a one-contact or two-contact swipe gesture oriented either upward or downward. Alternatively, the content sampling command may involve selecting a scrapbook UI control feature. The user may save the digital content sample into a new scrapbook or save it to an existing scrapbook. The user may also engage the scrapbooking function by entering a scrapbook viewing mode which allows the user to view and edit existing scrapbooks. The user may create, delete, or edit notes relating to the scrapbook, or reorder the scrapbook pages. The user may also access the original source of the sampled content, for instance, based on embedded data of that sampled content (such as by selecting a hyperlink in the digital sample), and may download scrapbooks and/or share them with users of other electronic devices.

General Overview

As previously explained, electronic display devices such as tablets, eReaders, and smart phones are commonly used for displaying user interfaces and consumable content. The user of such devices can typically consume the displayed content with relative ease. In some instances, the user may wish to save portions of digital content into a personalized digital scrapbook which may be viewed and edited by the user. While general functions suitable for copying and pasting content into user-created documents or files may be available in some electronic devices, a scrapbooking function as described herein may provide a more intuitive or otherwise positive user experience.

Thus, and in accordance with an embodiment of the present invention, digital scrapbooking techniques are disclosed for use in electronic touch screen devices. A digital scrapbooking function allows a user to virtually rip or sample digital content and save that content into a personalized collection or digital scrapbook. The digital scrapbook may include a collection of other chosen content saved from numerous digital content sources. For instance, the content being sampled may include selected pages or portions of a digital catalogue, magazine, comics, eBook, text, graphics, images, audio/video files, and/or other digital content that may be accessed through an eReader application or other computing device content consumption interface. In some embodiments, the scrapbooking function may be completely integrated within an eReader application, thus making the scrapbook creation mode part of the eReading experience.

In some embodiments, the digital content sample that is virtually ripped may include all of the metadata that may be present in the original digital content source. For example, the embedded metadata may include any hot-spots (hyperlinks), catalog product detail information, html text-data, pictures or video, links to the website including affiliate IDs, a unique identifying number of the original content being sampled (e.g., UPC, EAN, or other international product/article identifiers), and/or any other embedded data. Further-more, in some embodiments the digital content sample may itself act as a link that can allow the user to access the original digital content source using one or more touch screen gestures or UI control features. Each digital content sample may be an individual page in the digital scrapbook, or a portion of a scrapbook page comprising multiple digital content samples. Once a digital scrapbook has been created, the scrapbook function may allow the user to view and edit that scrapbook. Given the global nature and/or uniqueness of the engagement mechanism, in accordance with some example embodiments, the scrapbook creation mode and/or scrapbook viewing mode can be similarly invoked within multiple diverse applications (e.g., eReader, browser, picture viewer, etc.) and without conflicting with other global gestures that might also be used by the device's operating system.

In some embodiments, the user can engage the scrapbook function by performing a content sampling command that invokes a scrapbook creation mode. The content sampling command may involve selecting a scrapbook icon or UI control feature, or the sampling command may be a specific touch screen gesture. In one specific embodiment, the content sampling command is a two-contact swipe gesture performed over the content that is to be sampled. In other embodiments, the swipe gesture may include fewer or more contact points, as will be appreciated in light of this disclosure. As used herein, a swipe gesture may include a sweeping or dragging gesture across at least a portion of the touch sensitive surface; whether directly contacting that surface or hovering over that surface (e.g., within a few centimeters or otherwise close enough to be detected by the touch sensitive surface). In some embodiments, the swipe gesture may be performed at a constant speed in one single direction, while in other embodiments the swipe gesture may follow a curved path or a path that delineates the content to be sampled. The gestures can be performed, for example, with the tip of a finger or a stylus, or any other suitable implement capable of providing a detectable swipe gesture. Once invoked, the scrapbook creation mode may sample the content currently displayed (or otherwise selected) on the device and display the digital content sample along with a scrapbook control menu, in accordance with an embodiment.

The scrapbook control menu may allow the user to create a new scrapbook for the content sample or add that content sample to an existing scrapbook. The user may also create or change the name of scrapbooks through a scrapbook control menu. In some embodiments, the user may abandon the scrapbook function by, for example, closing a scrapbook control menu, tapping an area of the screen away from the scrapbook control menu, or waiting a specified period of time (e.g., five seconds) without selecting a destination for the digital content sample. A number of control functions suitable for scrapbooking will be apparent in light of this disclosure. In some embodiments, scrapbooked content may be viewed as html text-based content, or as a static image. If a user scrapbooks a page that includes an article, the text-based article may also be included in the destination scrapbook. Likewise, if a catalogue is scrapbooked, the scrapbooking function may also download the product detail screen information in some embodiments.

The user may also engage the scrapbook function by invoking a scrapbook viewing mode, in accordance with an embodiment. The scrapbook viewing mode may be invoked, for example, by selecting an existing digital scrapbook file either with a touch screen tap, a gesture, or some other suitable selection technique. In some embodiments, the selected digital scrapbook may be displayed to the user using an eReader application or other suitable viewing interface in the same way the user might read any digital magazine or catalogue. Once the scrapbook viewing mode has been invoked, the user may view the scrapbook, add notes to the scrapbook, rearrange scrapbook pages, or otherwise edit the digital scrapbook. The user may also interact with the scrapbook via embedded data of the sampled content, such as by accessing an embedded video or audio file, clicking a hyperlink to the original source, or engaging an embedded functional script or code.

The techniques have a number of advantages, as will be appreciated in light of this disclosure. For instance, in some cases, the techniques can be employed to provide an intuitive way for a student to create personalized and interactive classroom notes. In some such embodiments, a student can browse and collect sample sections of a digital textbook, lecture notes, slides, lecture videos or audio files, or other digital classroom materials, thus creating a scrapbook out of sampled materials relating to a specific course. In such cases, for instance, the lecture notes, slides, or other digital content sources may contain embedded data such as hyperlinks, hotspots, highlighted sections, rich media, or other encoded data that remains in the content samples saved to the student's digital scrapbook. In some example cases, the individual scrapbook pages may be used as flashcards, class notes, student quizzes, etc. In one specific example, a digital scrapbook may be used to create a wish list or shopping list across a range of catalogues. In a more general sense, techniques can be employed to provide an intuitive way for a user to create personalized and interactive aggregation of educational materials or other digital content from multiple sources, wherein the user can readily access the original content sources of the sampled content.

Architecture

Figure 1B:
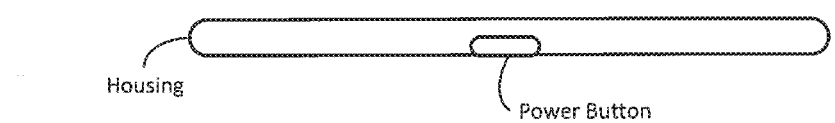

FIGS. 1a-b illustrate an example electronic touch sensitive device having a scrapbook function configured in accordance with an embodiment of the present invention. As can be seen, in this example embodiment, the touch sensitive surface is a touch screen display. The device could be, for example, a tablet such as the NOOK® tablet or eReader by Barnes & Noble. In a more general sense, the device may be any electronic device having a touch sensitive user interface for detecting direct touch or otherwise sufficiently proximate contact, and capability for displaying content to a user, such as a mobile phone or mobile computing device such as a laptop, a desktop computing system, a television, a smart display screen, or any other device having a touch sensitive display or a non-sensitive display screen that can be used in conjunction with a touch sensitive surface. As will be appreciated in light of this disclosure, the claimed invention is not intended to be limited to any specific kind or type of electronic device or form factor.

As can be seen with this example configuration, the device comprises a housing that includes a number of hardware features such as a power button, control features, and a press-button (sometimes called a home button herein). A user interface is also provided, which in this example embodiment includes a quick navigation menu having six main categories to choose from (Home, Library, Shop, Search, Light, and Settings) and a status bar that includes a number of icons (a night-light icon, a wireless network icon, and a book icon), a battery indicator, and a clock. Other embodiments may have fewer or additional such UI features, or different UI features altogether, depending on the target application of the device. Any such general UI controls and features can be implemented using any suitable conventional or custom technology, as will be appreciated.

The hardware control features provided on the device housing in this example embodiment are configured as elongated press-bars and can be used, for example, to page forward (using the top press-bar) or to page backward (using the bottom press-bar), such as might be useful in an eReader application. The power button can be used to turn the device on and off, and may be used in conjunction with a touch-based UI control feature that allows the user to confirm a given power transition action request (e.g., such as a slide bar or tap point graphic to turn power off). Numerous variations will be apparent, and the claimed invention is not intended to be limited to any particular set of hardware buttons or UI features, or device form factor.

In this example configuration, the home button is a physical press-button that can be used as follows: when the device is awake and in use, pressing the button will display the quick navigation menu, which is a toolbar that provides quick access to various features of the device. The home button may also be configured to cease an active function that is currently executing on the device (such as a scrapbook creation or viewing function), or close a configuration sub-menu that is currently open. The button may further control other functionality if, for example, the user presses and holds the home button. For instance, an example such push-and-hold function could engage a power conservation routine where the device is put to sleep or an otherwise lower power consumption mode. So, a user could grab the device by the button, press and keep holding as the device is stowed into a bag or purse. Thus, one physical gesture may safely put the device to sleep. In such an example embodiment, the home button may be associated with and control different and unrelated actions: 1) show the quick navigation menu; 2) exit a configuration sub-menu; and 3) put the device to sleep. As can be further seen, the status bar may also include a book icon (upper left corner). In some cases, selecting the book icon may provide bibliographic information on the content or provide the main menu or table of contents for the book, movie, playlist, or other content.

Figure 1C:
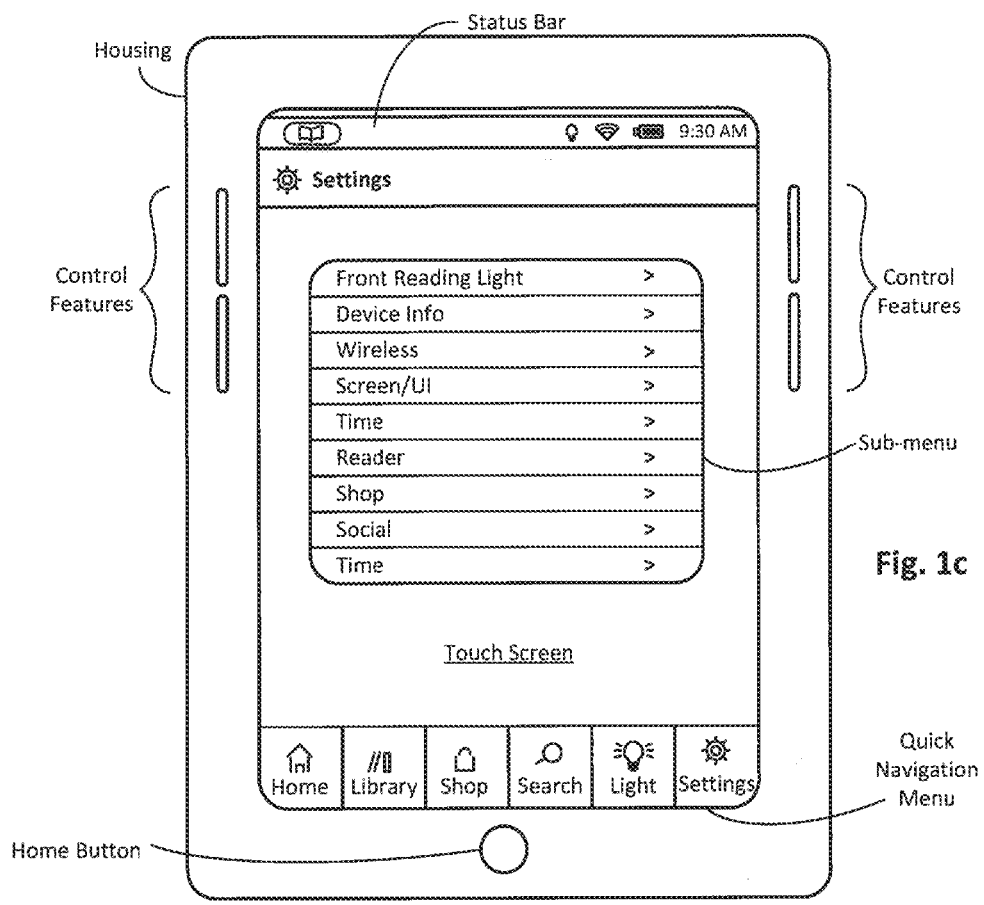
FIGS. 1c-d illustrate example configuration screen shots of the user interface of the electronic touch screen device shown in FIGS. 1a-b, configured in accordance with an embodiment of the present invention.
Figure 1D:
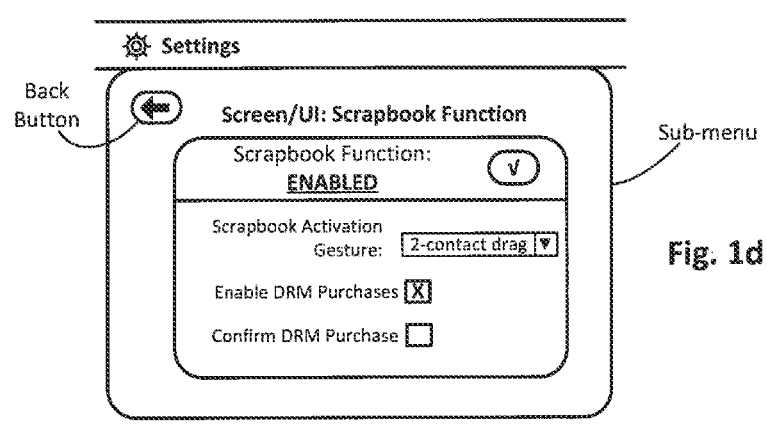

In one particular embodiment, a scrapbook function configuration sub-menu, such as the one shown in FIG. 1d, may be accessed by selecting the Settings option in the quick navigation menu, which causes the device to display the general sub-menu shown in FIG. 1c. From this general sub-menu, the user can select any one of a number of options, including one designated Screen/UI in this specific example case. Selecting this sub-menu item may cause the configuration sub-menu of FIG. 1d to be displayed, in accordance with an embodiment. In other example embodiments, selecting the Screen/UI option may present the user with a number of additional sub-options, one of which may include a so-called "scrapbook function" option, which may then be selected by the user so as to cause the scrapbook function configuration sub-menu of FIG. 1d to be displayed. Any number of such menu schemes and nested hierarchies can be used, as will be appreciated in light of this disclosure. In other example embodiments, the scrapbook function is hard-coded such that no configuration sub-menus are needed or otherwise provided (e.g., performing a two-contact swipe gesture to sample and save the current page to a scrapbook as described herein, with no user configuration needed). The degree of hard-coding versus user-configurability can vary from one embodiment to the next, and the claimed invention is not intended to be limited to any particular configuration scheme of any kind, as will be appreciated.

As will be appreciated, the various UI control features and sub-menus displayed to the user are implemented as touch screen controls in this example embodiment. Such UI screen controls can be programmed or otherwise configured using any number of conventional or custom technologies. In general, the touch screen display translates a touch (direct or hovering, by a user's hand, a stylus, or any other suitable implement) in a given location into an electrical signal which is then received and processed by the device's underlying operating system (OS) and circuitry (processor, display controller, etc.). In some instances, note that the user need not actually physically touch the touch sensitive device to perform an action. For example, the touch screen display may be configured to detect input based on a finger or stylus hovering over the touch sensitive surface (e.g., within 3 centimeters of the touch screen or otherwise sufficiently proximate to be detected by the touch sensing circuitry). Additional example details of the underlying OS and circuitry in accordance with some embodiments will be discussed in turn with reference to FIG. 2a.

The touch sensitive surface (or touch sensitive display, in this example case) can be any surface that is configured with touch detecting technologies, whether capacitive, resistive, acoustic, active-stylus, and/or other input detecting technology, including direct contact and/or proximate contact. In some embodiments, the screen display can be layered above input sensors, such as a capacitive sensor grid for passive touch-based input, such as with a finger or passive stylus contact in the case of a so-called in-plane switching (IPS) panel, or an electro-magnetic resonance (EMR) sensor grid for sensing a resonant circuit of a stylus. In some embodiments, the touch sensitive display can be configured with a purely capacitive sensor, while in other embodiments the touch screen display may be configured to provide a hybrid mode that allows for both capacitive input and EMR input, for example. In still other embodiments, the touch sensitive surface is configured with only an active stylus sensor. Numerous touch screen display configurations can be implemented using any number of known or proprietary screen based input detecting technologies. In any such embodiments, a touch sensitive controller may be configured to selectively scan the touch sensitive surface and/or selectively report user inputs detected directly on or otherwise sufficiently proximate to (e.g., within a few centimeters, or otherwise sufficiently close so as to allow detection) the detection surface (or touch sensitive display, in this example case).

As previously explained, and with further reference to FIGS. 1c and 1d, once the Settings sub-menu is displayed (FIG. 1c), the user can then select the Screen/UI option. In response to such a selection, the scrapbook function configuration sub-menu shown in FIG. 1d can be provided to the user, in accordance with one such example embodiment. The user can configure a number of features with respect to the scrapbook function, in this example case. For instance, the configuration sub-menu includes a UI check box that when checked or otherwise selected by the user, effectively enables the scrapbook function (shown in the enabled state); unchecking the box disables the function. Other embodiments may have the scrapbook function always enabled, or enabled by a physical switch or button located on the device, for example. As previously explained, the scrapbook creation mode may be invoked using a content sampling gesture. In some cases, the user may configure the content sampling gesture, and in this particular embodiment, the user has selected the two-contact drag gesture as the sampling gesture. Other embodiments may use a different gesture, such as a one-contact drag gesture, a circle gesture, or any other recognizable gesture that can be used to distinctly indicate that scrapbook mode is desired. In one specific embodiment, an S-shaped gesture is used to sample content. As can be seen in this example, the desired gesture has been selected from a drop-down menu. In still other embodiments, note that a touch screen gesture is not necessarily required. For instance, in a desktop computing application having a non-touch display and a mouse, the content sampling gesture can be the user dragging the cursor (via a click-and-hold mouse-based drag). In a more general sense, any suitable user input techniques can be used to interact with the scrapbooking function provided herein. Examples provided herein focus on touch screen technology, but this should not be understood to limit the claimed invention to touch sensitive technology.

With further reference to the example embodiment of FIG. 1d, the user has the option to enable a digital rights management (DRM) based purchases (Enable DRM Purchases), and a DRM purchase confirmation feature (Confirm DRM Purchase) using UI check boxes. In more detail, in order to save a digital content sample into the user's scrapbook, copyright or other digital rights in the underlying source material may need to be licensed, and may or may not require a payment. In some cases, purchasing the source material from an online shopping source, such as an eBook store, may generally grant the user the right to save copies of certain pages into scrapbooks for personal use, while in other cases an additional or separate royalty might be required to make such copies. If the desired content is restricted such that it cannot be sampled without a royalty payment (or some further licensing procedure), then the user may be informed of that restriction through a prompt (e.g., "This material is protected by copyright and cannot be sampled"). In such cases, if the user has enabled DRM-based purchases (by checking the Enable DRM purchases check box), then the user may be further prompted with a purchasing sequence of one or more steps. Otherwise, the restricted content is not allowed to be sampled. Thus, the user can enable the DRM purchase feature to give the user the option to pay an additional fee or otherwise acquire rights necessary to sample protected content into the user's scrapbooks. Disabling the DRM purchase feature can be used in some embodiments to effectively limit the user to sample only unprotected/free or otherwise properly acquired content into scrapbooks. If the user has also checked the Confirm DRM purchase check box, one of those steps can prompt the user to confirm the purchase (e.g., "Do you wish to purchase a sample of this content?"). A purchase confirmation may not be desired, as it generally requires an extra step. In this particular example, the user has activated the DRM purchase option and the confirm DRM purchase option is not activated. So, the user may be able to purchase content using a pre-established purchasing account (e.g. credit card or online payment service) with one to two taps on a touch sensitive screen. Any suitable purchasing sequence and mechanisms can be used, as will be appreciated.

As can be further seen, a back button arrow UI control feature may be provisioned on the screen for any of the menus provided, so that the user can go back to the previous menu, if so desired. Note that configuration settings provided by the user can be saved automatically (e.g., user input is saved as selections are made or otherwise provided). Alternatively, a save button or other such UI feature can be provisioned, which the user can engage as desired. The configuration sub-menu shown in FIG. 1d is presented merely as an example of how a scrapbook function may be configured by the user, and numerous other configurable or hard-codable aspects will be apparent in light of this disclosure. Note that in some embodiments the scrapbook function may be visually and/or aurally demonstrated or otherwise confirmed to the user via animations and/or sound effects. Such animations and sound effects may be used to provide clarity to the function being performed or otherwise enhance the user experience. In some embodiments, such animations and sound effects may be user-configurable, while in other embodiments they are hard-coded.

Figure 2A:
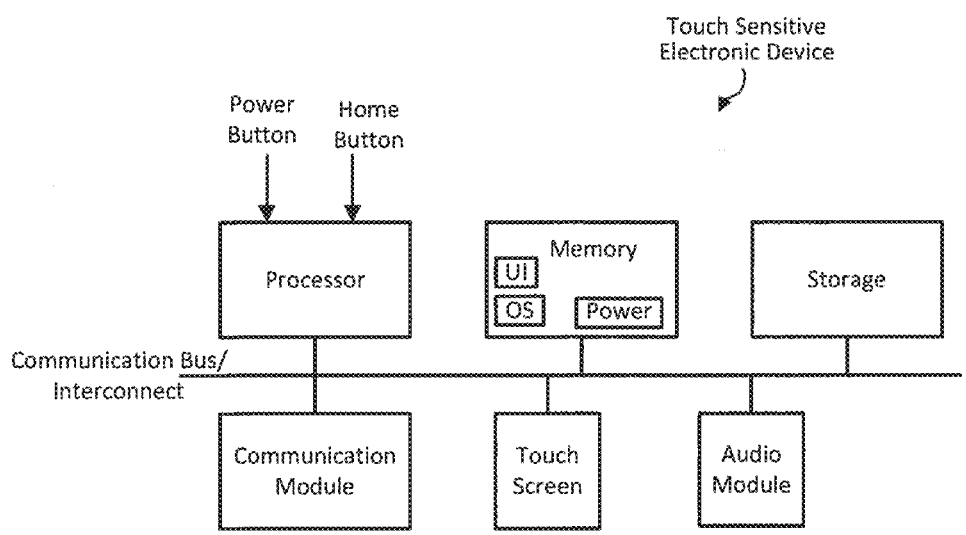
FIG. 2a illustrates a block diagram of an electronic touch screen device configured in accordance with an embodiment of the present invention.

FIG. 2a illustrates a block diagram of an electronic touch screen device configured in accordance with an embodiment of the present invention. As can be seen, this example device includes a processor, memory (e.g., RAM and/or ROM for processor workspace and storage), additional storage/memory (e.g., for content), a communications module, a touch screen, and an audio module. A communications bus and interconnect is also provided to allow inter-device communication. Other typical componentry and functionality not reflected in the block diagram will be apparent (e.g., battery, co-processor, etc). The touch screen and underlying circuitry is capable of translating a user's contact (direct or proximate) with the touch screen into an electronic signal that can be manipulated or otherwise used to trigger a specific user interface action, such as those provided herein. The principles provided herein equally apply to any such touch sensitive devices. For ease of description, examples are provided with touch screen technology.

In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc), and encoded on a machine readable medium, that when executed by the processor (and/or co-processors), carries out the functionality of the device including a UI having a scrapbook function as variously described herein. The computer readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

The processor can be any suitable processor (e.g., Texas Instruments OMAP4, dual-core ARM Cortex-A9, 1.5 GHz), and may include one or more co-processors or controllers to assist in device control. In this example case, the processor receives input from the user, including input from or otherwise derived from the power button and the home button. The processor can also have a direct connection to a battery so that it can perform base level tasks even during sleep or low power modes. The memory (e.g., for processor workspace and executable file storage) can be any suitable type of memory and size (e.g., 256 or 512 Mbytes SDRAM), and in other embodiments may be implemented with non-volatile memory or a combination of non-volatile and volatile memory technologies. The storage (e.g., for storing consumable content and user files) can also be implemented with any suitable memory and size (e.g., 2 GBytes of flash memory). The display can be implemented, for example, with a 7 to 9 inch 1920×1280 IPS LCD touchscreen touch screen, or any other suitable display and touchscreen interface technology. The communications module can be, for instance, any suitable 802.11b/g/n WLAN chip or chip set, which allows for connection to a local network, and so that content can be exchanged between the device and a remote system (e.g., content provider or repository depending on the application of the device). In some specific example embodiments, the device housing that contains all the various componentry measures about 7" to 9" high by about 5" to 6" wide by about 0.5" thick, and weighs about 7 to 8 ounces. Any number of suitable form factors can be used, depending on the target application (e.g., laptop, desktop, mobile phone, etc). The device may be smaller, for example, for smartphone and tablet applications and larger for smart computer monitor and laptop and desktop computer applications.

The operating system (OS) module can be implemented with any suitable OS, but in some example embodiments is implemented with Google Android OS or Linux OS or Microsoft OS or Apple OS. As will be appreciated in light of this disclosure, the techniques provided herein can be implemented on any such platforms. The power management (Power) module can be configured as typically done, such as to automatically transition the device to a low power consumption or sleep mode after a period of non-use. A wake-up from that sleep mode can be achieved, for example, by a physical button press and/or a touch screen swipe or other action. The user interface (UI) module can be, for example, based on touchscreen technology and the various example screen shots and use-case scenarios shown in FIGS. 1a, 1c-d, 3a-d, 4a-e, 5a-d, and 6a-g, and in conjunction with the scrapbooking methodologies demonstrated in FIG. 7, which will be discussed in turn. The audio module can be configured to speak or otherwise aurally present, for example, a digital content sample, a selected eBook, or other textual content, and/or to provide verbal and/or other sound-based cues and prompts to guide the scrapbooking process, as will be appreciate in light of this disclosure. Numerous commercially available text-to-speech modules can be used, such as Verbose text-to-speech software by NCH Software. In some example cases, if additional space is desired, for example, to store digital books or other content and media, storage can be expanded via a microSD card or other suitable memory expansion technology (e.g., 32 GBytes, or higher). Further note that although a touch screen display is provided, other embodiments may include a non-touch screen and a touch sensitive surface such as a track pad, or a touch sensitive housing configured with one or more acoustic sensors, etc.

Client-Server System

Figure 2B:
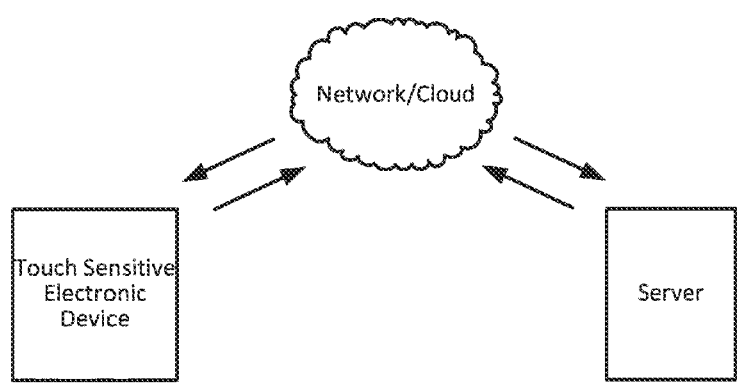
FIG. 2b illustrates a block diagram of a communication system including the electronic touch screen device of FIG. 2a, configured in accordance with an embodiment of the present invention.

FIG. 2b illustrates a block diagram of a communication system configured in accordance with an embodiment of the present invention. As can be seen, the system generally includes an electronic touch sensitive device (such as the one in FIG. 2a) that is capable of communicating with a server via a network/cloud. In this example embodiment, the electronic touch sensitive device may be, for example, an eBook reader, a mobile cell phone, a laptop, a tablet, desktop, or any other touch sensitive computing device. The network/cloud may be a public and/or private network, such as a private local area network operatively coupled to a wide area network such as the Internet. In this example embodiment, the server may be programmed or otherwise configured to receive content requests from a user via the touch sensitive device and to respond to those requests by performing a desired function or providing the user with requested or otherwise recommended content. Is some such embodiments, the server is configured to remotely provision a scrapbook function as provided herein to the touch screen device (e.g., via JavaScript or other browser based technology). In other embodiments, portions of the scrapbooking methodology can be executed on the server and other portions of the methodology can be executed on the device. Numerous server-side/client-side execution schemes can be implemented to facilitate a scrapbook function in accordance with an embodiment, as will be apparent in light of this disclosure.

Scrapbook Function Examples

FIGS. 3a-d collectively illustrate an example scrapbook function that can be applied to a touch sensitive display of an electronic device, in accordance with an embodiment of the present invention. As can be seen, the device housing surrounds the touch screen of the device, and the device is displaying a page of a magazine (or any other digital content of interest to the user). The user can interact with the touch screen with fingers or other suitable implement, and in this embodiment the content sampling command used to invoke the scrapbook creation mode is configured to be a two-contact vertical swipe gesture. As will be appreciated, the content sample gesture could be oriented in any desired direction and may be configured by the user (using the configuration submenu of FIG. 1d) or hard-coded. In the particular example shown in FIG. 3a, the user is performing a two-contact downward swipe gesture. In the example shown in FIG. 3b, the user is performing a two-contact upward swipe gesture across the touch screen. In this example, performing the content sampling command prompts the device to virtually rip a sample of the digital content currently being displayed to the user on the touch screen.

In one example embodiment, when the device is in portrait mode, only one page of the content is shown on the display screen with a virtual binder along the left side of the display, and the scrapbooking mode can be configured to scan the left side of the screen only for the content sampling gesture (so as to scan near the virtual binder of the digital document, where a virtual tear gesture can be intuitively provided). In another example embodiment, when the device is in landscape mode, two pages of the content can be shown on the display screen with a virtual binder in the middle between the two pages, and the scrapbooking mode can be configured to only scan the middle screen portion of the screen for the content sampling gesture (again, so as to scan near the virtual binder of the digital document, where a virtual tear gesture can be intuitively provided). In still other embodiments, the entire touch screen display area can be scanned for the content sample gesture.

Figure 3A:
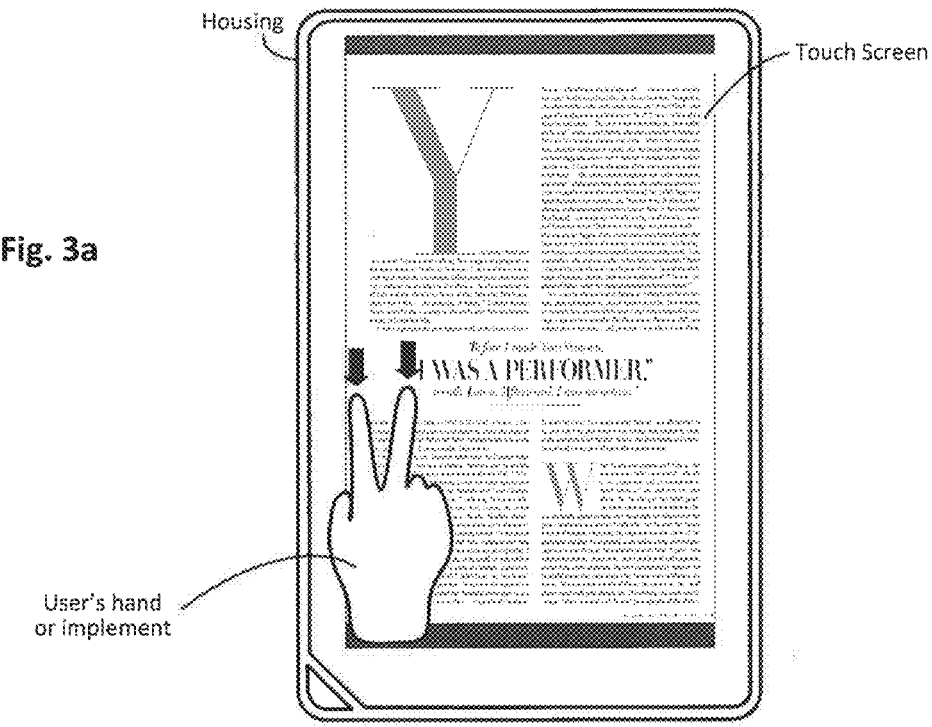
FIGS. 3a-d illustrate an example scrapbook function of an electronic touch screen device, in accordance with an embodiment of the present invention.
Figure 3B:
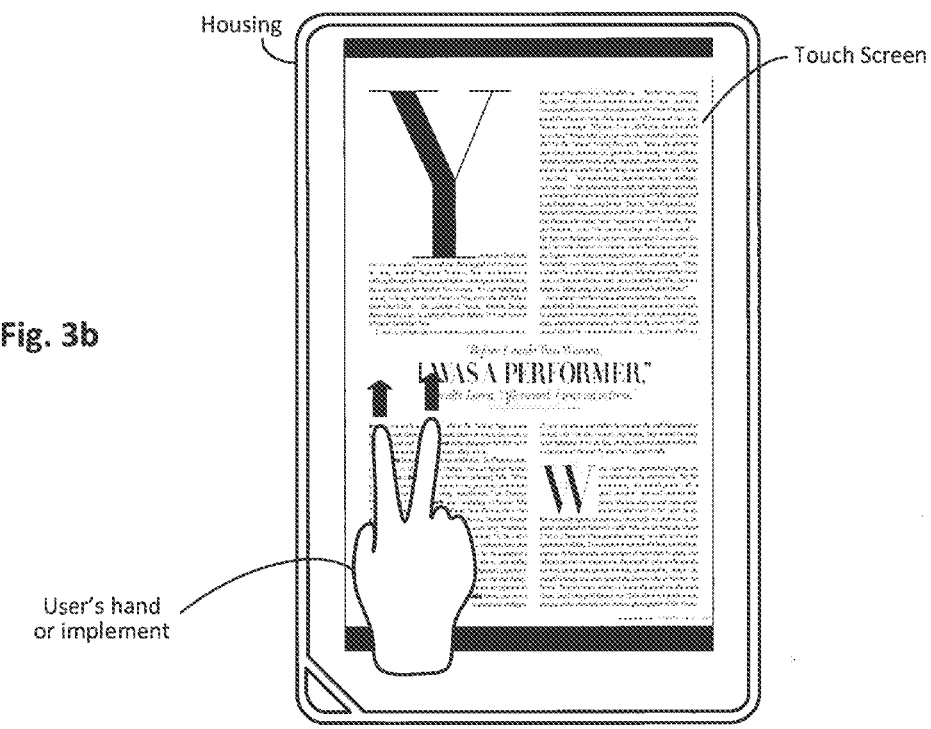
Figure 3C:
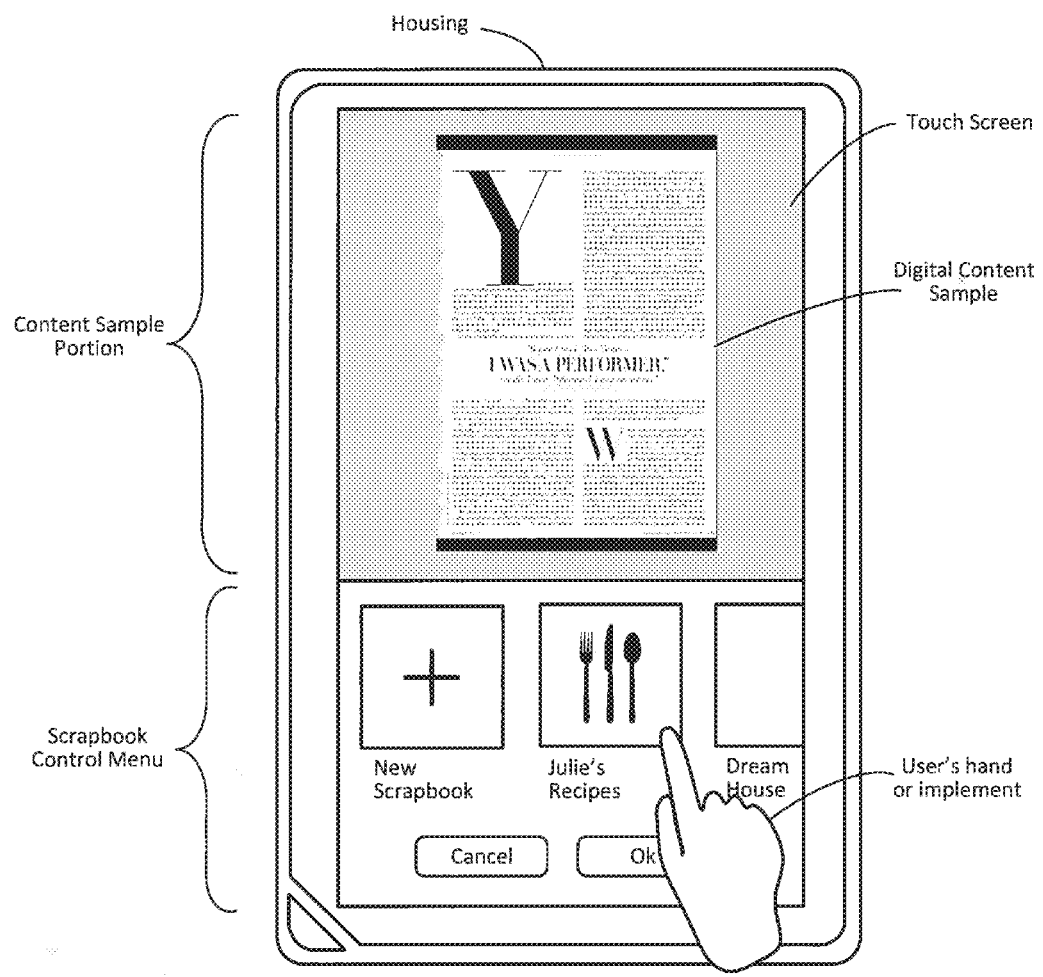

Once the content sampling command has been performed and detected, the scrapbook creation mode can be displayed to the user, as shown in the example embodiment of FIG. 3c. In this example, the scrapbook creation mode includes a content sample portion and a scrapbook control menu. The content sample portion displays to the user the digital content sample that has been virtually ripped from the original content source, and in this specific embodiment it is shown with an uneven torn edge on the side of the page, mimicking the look of a page torn from a physical magazine.

With further reference to the example embodiment of FIG. 3c, the scrapbook control menu shows a list of scrapbooks to the user, along with an icon for creating a new scrapbook, as well as UI control features for accepting and canceling the scrapbook creation mode. The scrapbook control menu may allow the user to select an existing scrapbook to save the digital content sample into, or create a new scrapbook for the sample. In this particular embodiment, the user has selected the scrapbook titled "Julie's Recipes" and the digital content sample is saved into that scrapbook. In some embodiments, the scrapbook creation mode may be further configured to allow the user to insert the sampled content at a specific user-selected location of the existing scrapbook (e.g., between pages 4 and 5, for instance). In some such cases, the pages of the existing scrapbook can be presented to the user along with page numbers and a progress bar in a scrapbook page viewer (similar to that shown in FIG. 5b-d) that appears in response to the user dragging a new sample to an existing scrapbook. The user can then hold the dragged sample to be dropped over the scrapbook viewer in such a fashion so as to cause the underlying pages in the scrapbook page viewer to scroll in either the forward or backward direction (e.g., by holding the content to be dropped toward the right side of viewer to page forward or toward the left side of the viewer to page backward). Once the user has scrolled to the desired drop location, the user can move the dragged content to be dropped into the center of the scrapbook page viewer and drop it at that location, thereby causing that dropped content to be inserted in the desired drop location. To this end, the scrapbooking function can leverage drag-and-drop functionality for navigating and placing of content within a given scrapbook. The user may also abandon the scrapbook function and close the scrapbook control menu by pressing the cancel UI control feature in this example.

Figure 3D:
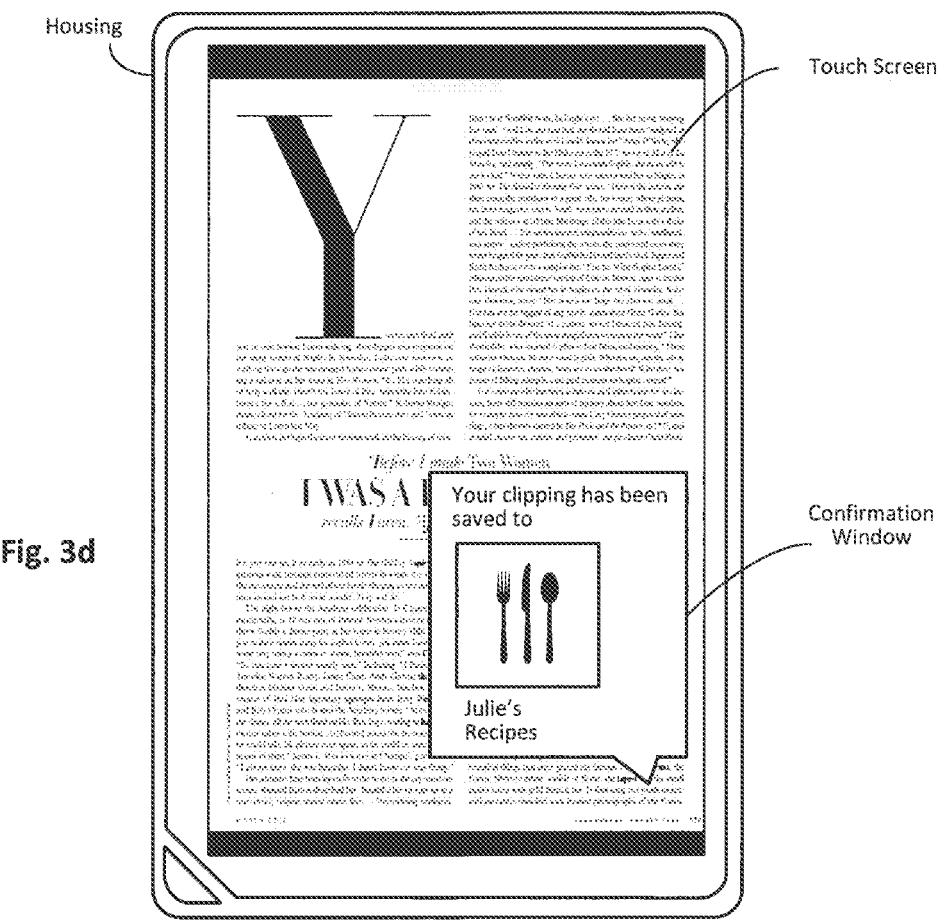

As can be seen in FIG. 3d, once the digital content sample has been saved into a selected scrapbook, the scrapbook creation mode may be further programmed or otherwise configured to display a confirmation window notifying the user that the clipping has been saved to the desired digital scrapbook. In one such example embodiment, the confirmation window is displayed to the user for a short period of time (e.g., three seconds) and then slowly fades away. The confirmation window may be semi-translucent, so as to not block the underlying content from view.

Figure 4A:
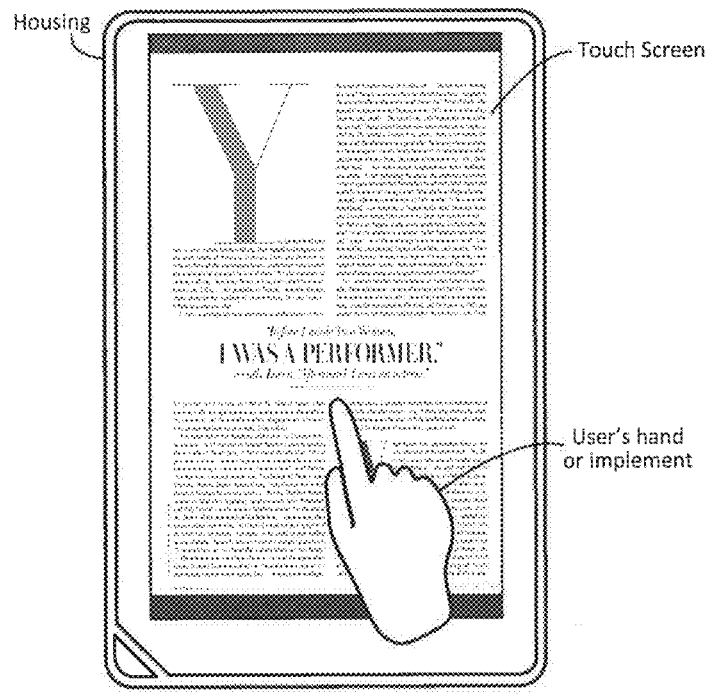
FIGS. 4a-e illustrate an example scrapbook function of an electronic touch screen device, in accordance with another embodiment of the present invention.
Figure 4B:
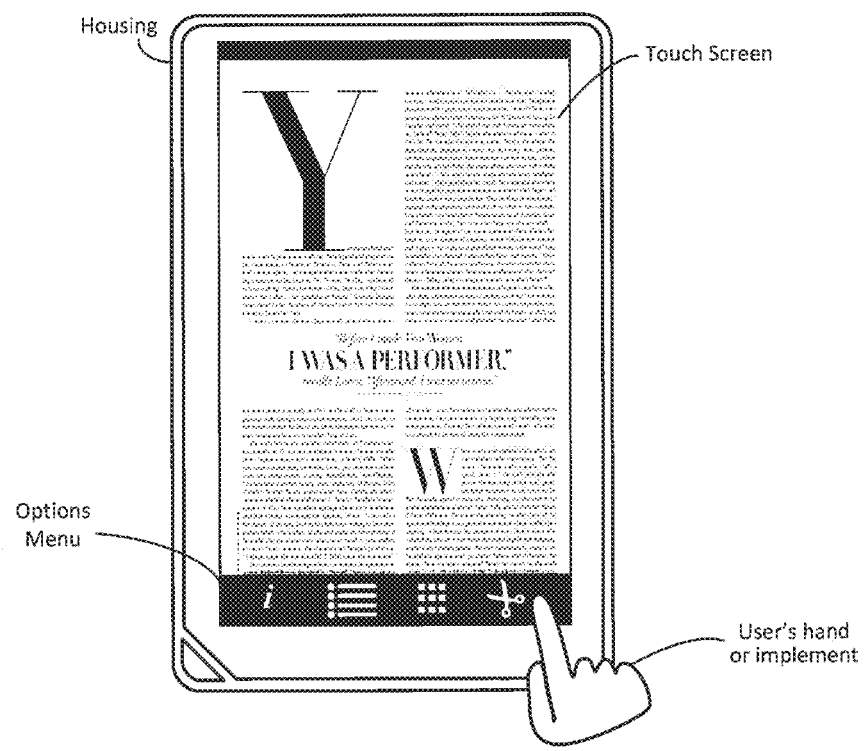
Figure 4C:
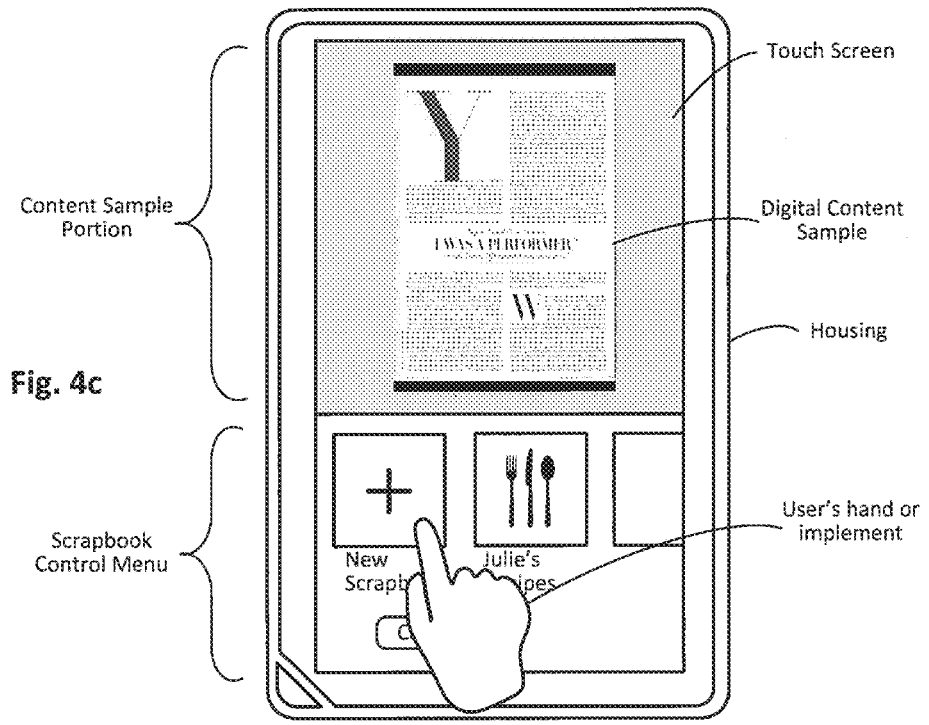

FIGS. 4a-e collectively illustrate an example scrapbook function that can be applied to a touch sensitive display of an electronic device, in accordance with another embodiment of the present invention. As can be seen, the device housing surrounds the touch screen of the device, the device is displaying a page of a magazine, and the user can interact with the touch screen with a finger or fingers or another suitable implement. In this example scenario, the content sampling command is provided by selecting a scrapbook icon from an options menu. In the particular example shown in FIGS. 4a-b, the user performs a quick tap gesture (e.g., lasting less than 1 second) on the touch screen device (FIG. 4a), so as to bring up an options menu (FIG. 4b).

Thus, the scrapbooking function of this example embodiment is configured to respond to a screen tap on a piece of content by providing the options menu. As can further be seen with reference to FIG. 4b, the options menu contains a number of icons, including an "i" which may display information regarding the content displayed on the device, a table of contents icon, a visual table of contents icon shown as a grid of tiles, and a scrapbooking icon that may appear as a pair of scissors. If the user wishes to virtually rip the content currently displayed on the device, the user can tap the scissors icon. In response to that content sampling command, the device may display the scrapbook creation mode shown in FIG. 4c, including the content sampling portion and the scrapbook control menu. As discussed in reference to FIG. 3c, the digital content sample may be shown with a torn edge, as if the page had been physically ripped from a magazine or catalogue.

Figure 4D:
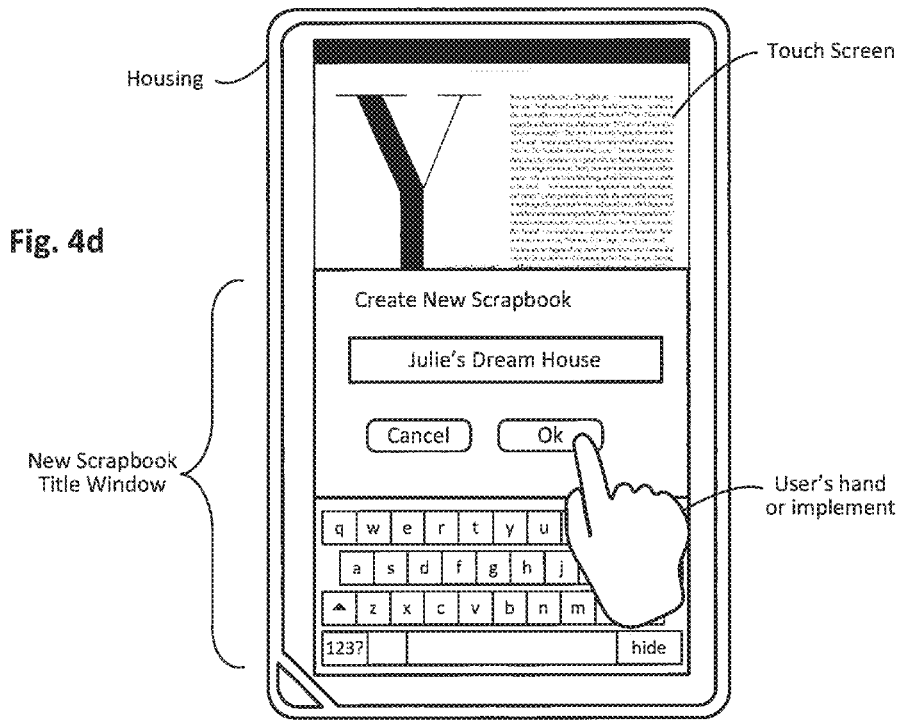
Figure 4E:
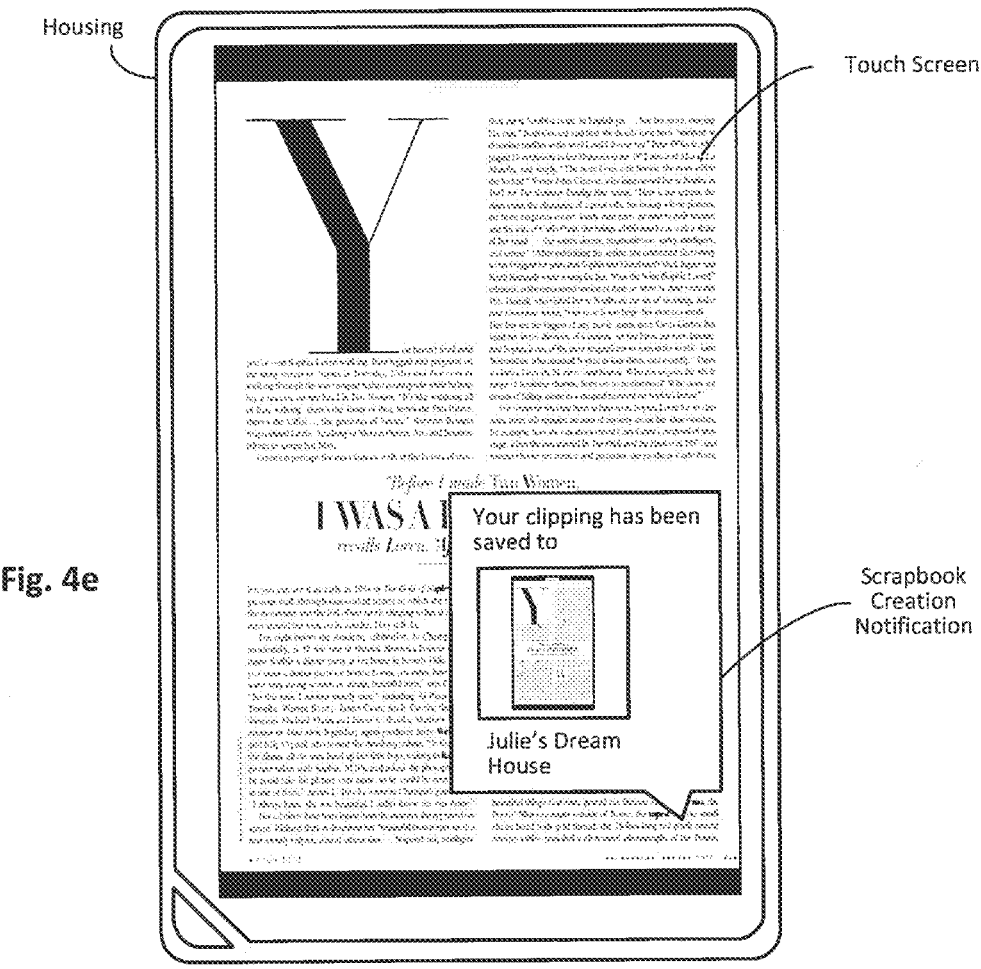

In this example embodiment, the user wishes to create a new scrapbook for the digital content sample, so the user selects the new scrapbook icon with a finger or other suitable implement. In some embodiments, when the new scrapbook icon is selected, the device may display a new scrapbook title window as shown in the example of FIG. 4d. The new scrapbook title window may include a virtual keyboard, in some embodiments, and the user may provide the scrapbook name or cancel the scrapbook naming and save function by selecting either a Cancel or Ok UI control feature. As can be seen in FIG. 4e, once the digital content sample has been saved into a new scrapbook, the scrapbook creation mode may display a confirmation window notifying the user that the clipping has been successfully saved. In one embodiment, the confirmation window is displayed to the user for a short period of time (e.g., three seconds) and then slowly fades away.

Figure 5A:
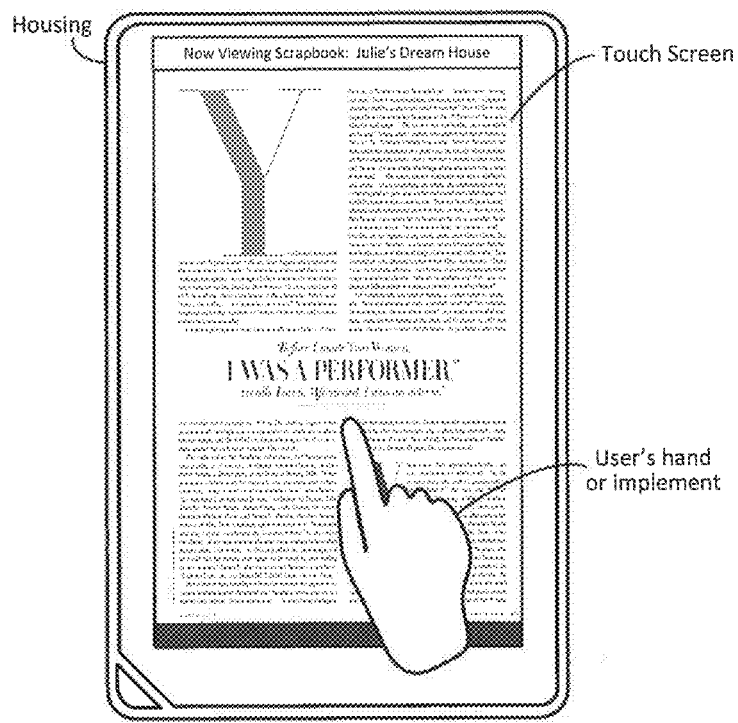
FIGS. 5a-d illustrate an example scrapbook viewing and editing mode of an electronic touch screen device, in accordance with another embodiment of the present invention.
Figure 5B:
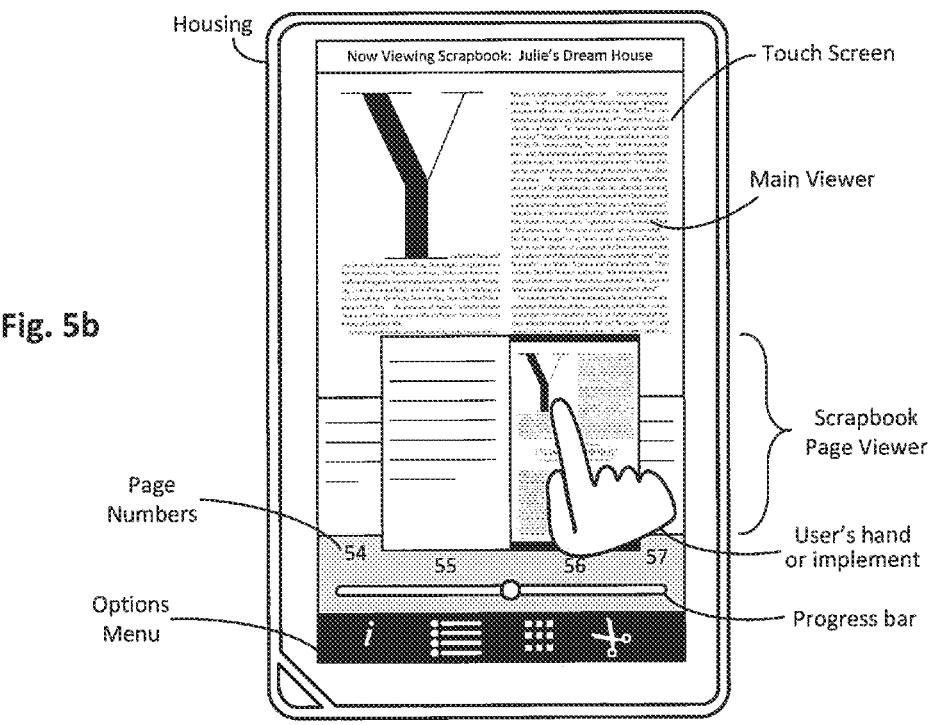

FIGS. 5a-d collectively illustrate an example scrapbook viewing and editing mode that can be applied to a touch sensitive display of an electronic device, in accordance with an embodiment of the present invention. As can be seen, the device housing surrounds the touch screen of the device, the device is displaying a page of one of the user's scrapbooks, and the user can interact with the touch screen with a finger or fingers or other suitable implement. In this particular example, the user performs a quick tap gesture (e.g., lasting less than 1 second) on the touch screen device (FIG. 5a), thus bringing up an options menu as well as a scrapbook page viewer graphic (FIG. 5b).

As can be seen in FIG. 5b, the page viewer graphic may show the page spreads of the scrapbook (a page spread refers to two neighboring pages with a virtual center binding), the scrapbook page numbers, and a progress bar that visually displays the location of the current page within the entire scrapbook. In some embodiments a digital scrapbook may be displayed to the reader in the same way content is displayed in a magazine or comics reader application. In one embodiment, a scrapbook may be opened for viewing and editing by selecting it from a scrapbook group within the device's digital library. The user can navigate the content using the scrapbook page viewer in a similar fashion to the main viewer, by swiping gestures over the displayed content to page forward and backward. In addition, a quick tap on a given page within the scrapbook page viewer will cause the main viewer to change to that page. As the user scrolls forward and backward through the content in the scrapbook page viewer, the page numbers scroll in unison as does the progress bar.

Figure 5C:
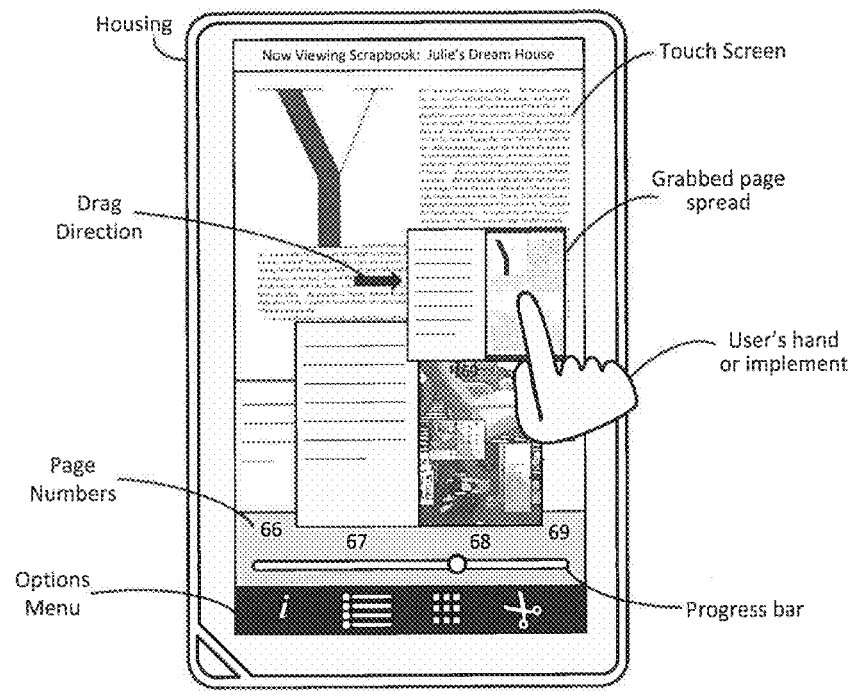
Figure 5D:
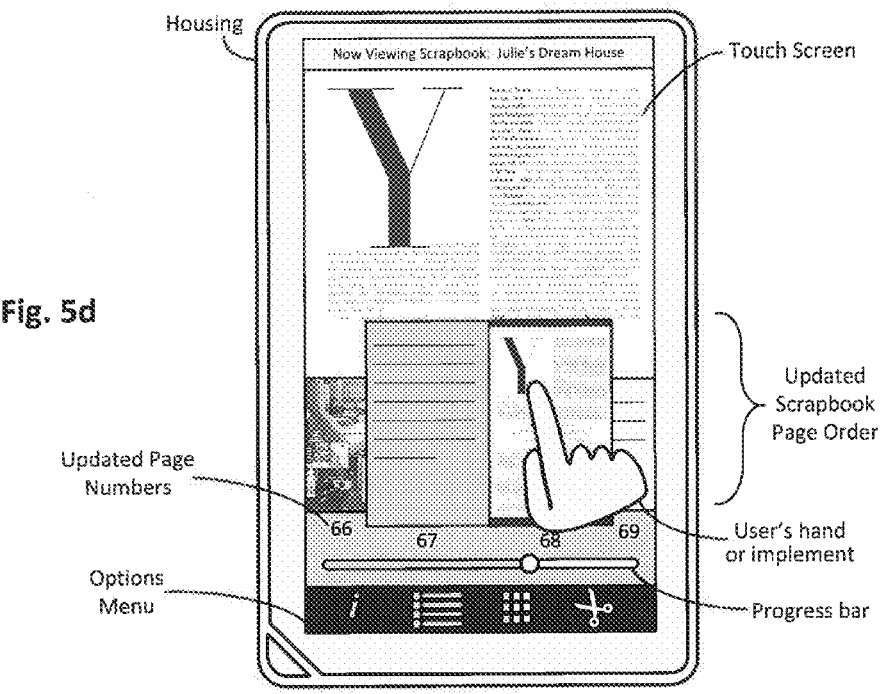

The user can also use the scrapbook page viewer to edit scrapbook content. For example, and as further shown in the example of FIG. 5b, the user may perform a press-and-hold gesture on one of the page spreads of the scrapbook page viewer to initiate a page reordering within the scrapbook. For instance, in this example, the press-and-hold gesture effectively grabs the selected page spread, and the user may drag the page spread to the right, as shown in FIG. 5c, in order to move the page spread to another area of the scrapbook in the forward direction. As the user holds the page to be moved against the right side of the device screen, the content of the scrapbook page viewer scrolls forward, as evidenced by the increasing page numbers from FIGS. 5b to 5c. As shown in the example of FIG. 5d, once the scrapbook page viewer scrolls to the desired location, the user may then drag-and-drop the page spread back into the scrapbook page viewer at that location (between pages 68 and 69, in this example scenario), such that the dropped page spread is inserted at that location and the page numbers are updated to reflect the new page order. In other scenarios, the pages of the scrapbook may be displayed as a grid of tiles, each tile being a page of the scrapbook, wherein the user can press-and-hold any one or set of selected tiles and drag-and-drop that set at a desired location within the tile grid to cause the pages to reorder accordingly. Numerous page ordering techniques can be used, as will be appreciated in light of this disclosure.

As previously explained, pages may also be added to a given scrapbook, and may also be deleted. For example, in one embodiment, the scrapbooking function is configured to delete content, for example, in response to a user providing an X-gesture on the page to deleted, or by selecting a page and then selecting a cut or delete UI control function. A delete confirmation (e.g., pop-up window with appropriate user prompt) can be provided as well. Numerous such editing tools will be apparent in light of this disclosure.

Figure 6A:
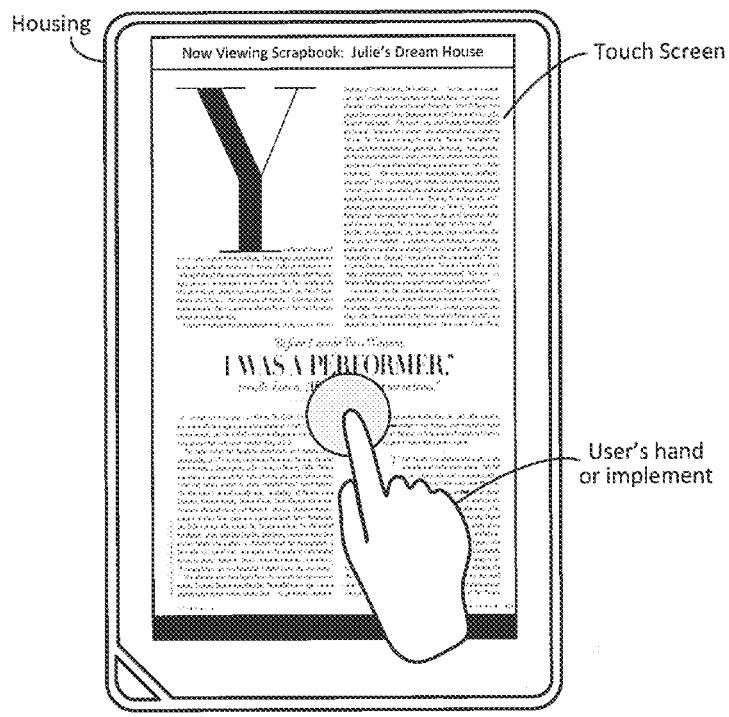
FIGS. 6a-g illustrate an example scrapbook viewing and editing mode of an electronic touch screen device, in accordance with another embodiment of the present invention.
Figure 6B:
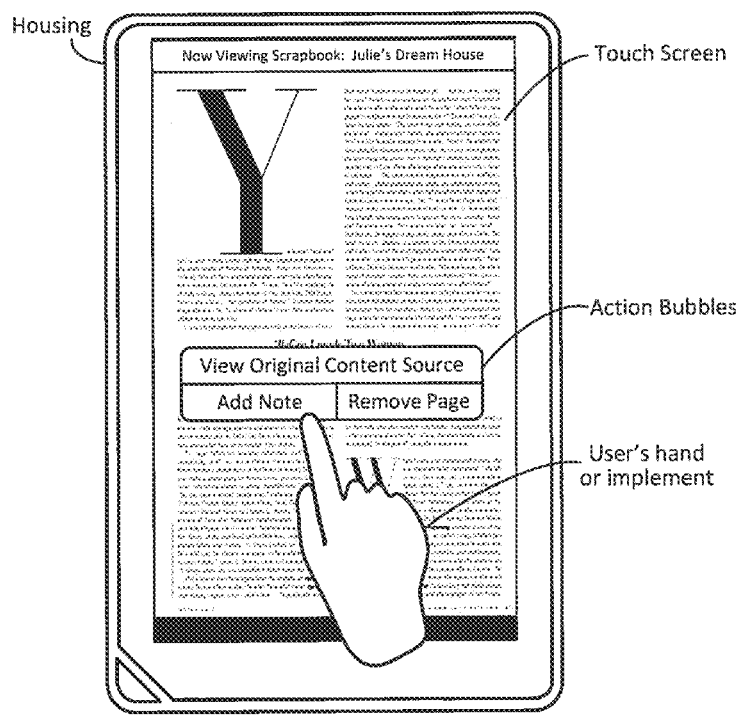
Figure 6C:
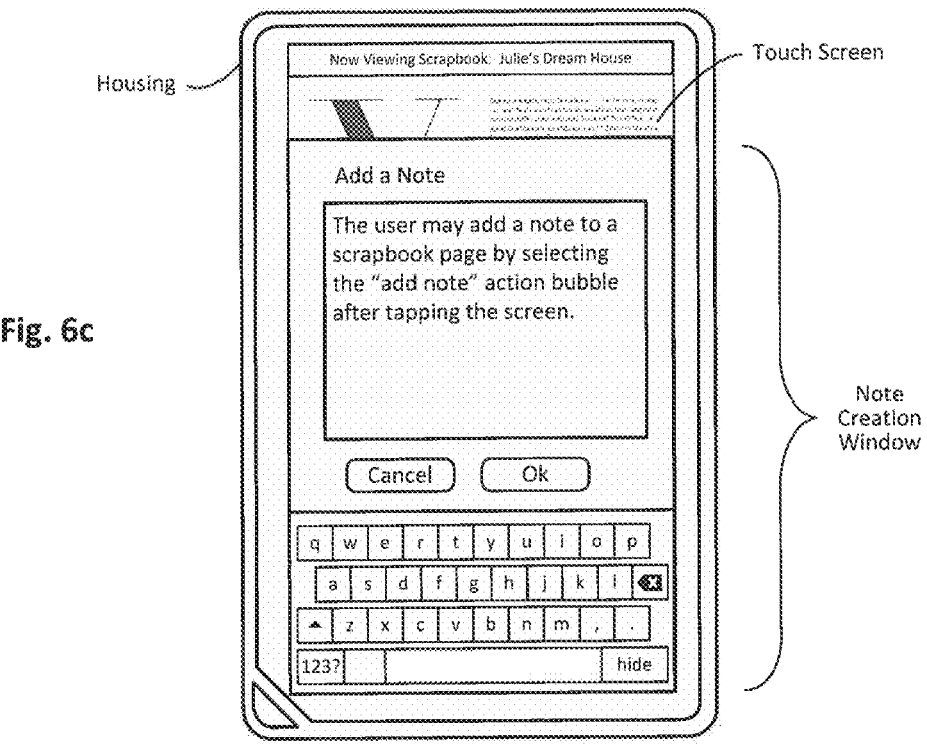
Figure 6D:
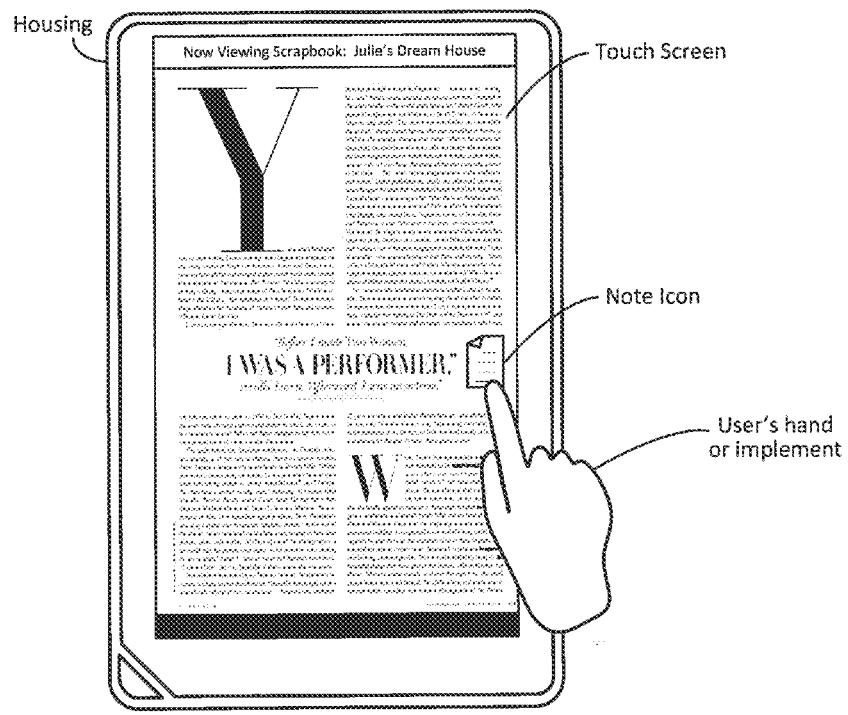

FIGS. 6a-g collectively illustrate an example scrapbook viewing and editing mode that can be applied to a touch sensitive display of an electronic device, in accordance with another embodiment of the present invention. As can be seen, the device housing surrounds the touch screen of the device, the device is displaying a page of one of the user's scrapbooks, and the user can interact with the touch screen with a finger or other suitable implement. In this particular example, the user performs a short tap-and-hold gesture, which may also be described as a long-press gesture (e.g., lasting about 1 to 3 seconds), on the touch screen device, thus bringing up a number of action bubbles allowing the user to remove the current page from the scrapbook, add a note, or view the original content source. In this example, selecting the "View Original Content Source" action bubble may bring the user to the digital content source from which that particular scrapbook page was virtually ripped. Such an embodiment allows the digital scrapbook to act as a link back to the magazine, catalogue, or other digital content from which the scrapbook page originated. In this particular example, the user wishes to add a note, and therefore has selected the "Add Note" action bubble as shown in FIG. 6b. In some embodiments, adding a note will bring up a note creation window, like the one shown in FIG. 6c, which allows the user to add a text note using a virtual keyboard in this example scenario. As can be further seen, the user may abandon the note adding function or save the note by selecting either the Cancel button or the Ok button within the note creation window. After creating a note, the scrapbook page may display a note icon, like the example one shown in FIG. 6d. In some such embodiments, the user may view the contents of the note by tapping the note icon.

Figure 6E:
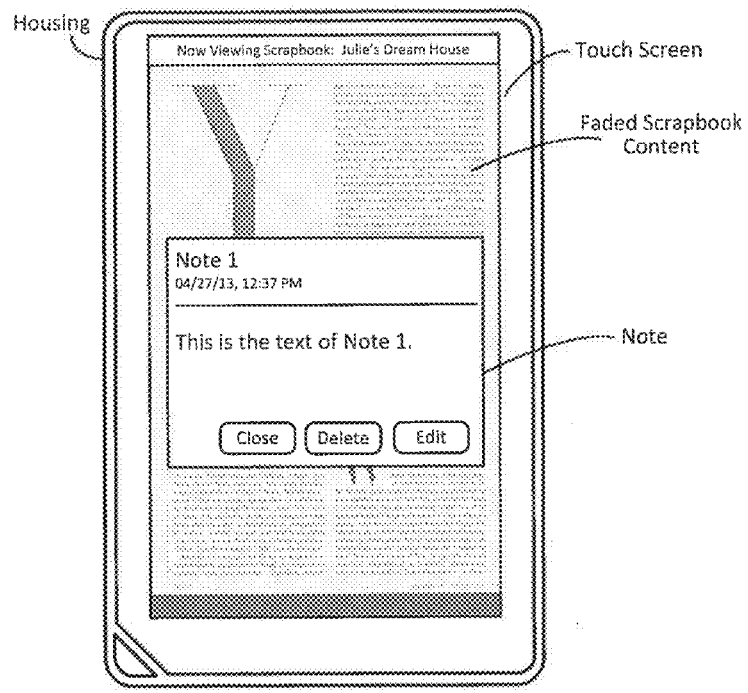
Figure 6F:
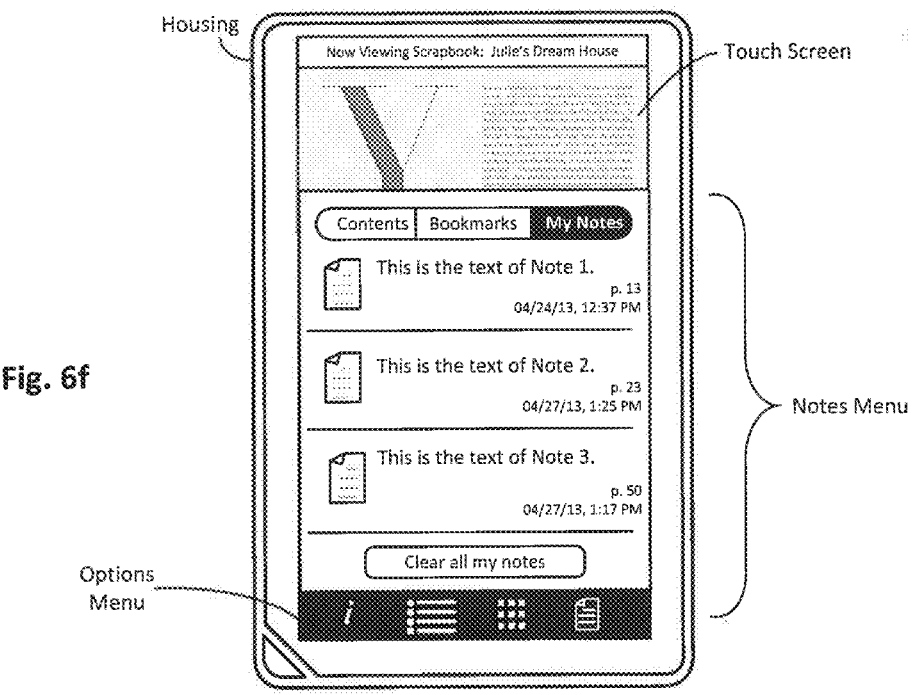
Figure 6G:
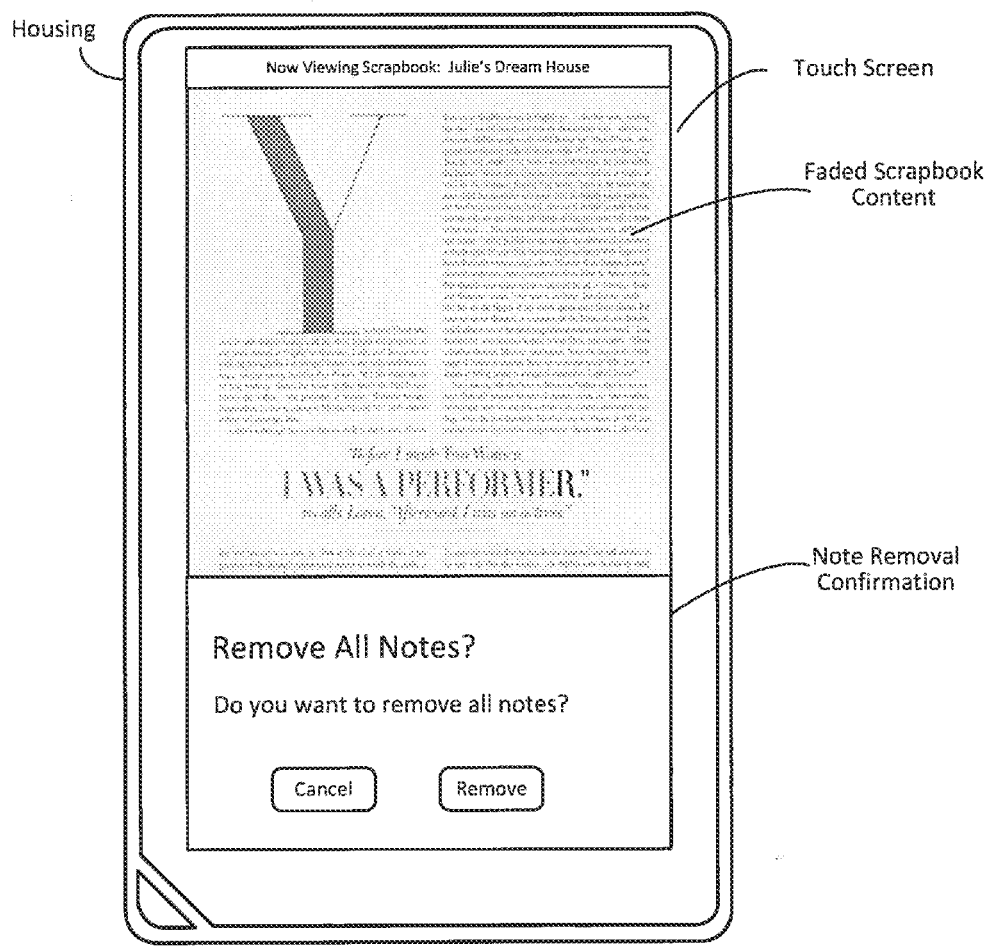

FIG. 6e shows an example of how the contents of a note may be displayed to the user after tapping the note icon. The note text may be shown along with the date and time of the note's creation. The user may select from a number of note options including, close, delete, or edit. In the example shown, the scrapbook content is shown faded in the background, or otherwise diminished in appearance with respect to the note. Alternatively, a note icon may be included in an options menu which may be displayed to the user after performing a short tap gesture on the touch screen, in accordance with some embodiments. The options menu may be similar to the one shown in FIG. 4b, but may include a note icon that when selected may display all of the notes associated with the particular scrapbook being displayed on the device. In the example shown in FIG. 6f, the scrapbook content appears faded behind a notes menu that is displaying three notes to the user. In this particular example, the user may select a specific note from the notes menu or clear all the notes. If the user wishes to remove all notes, selecting the "Clear all my notes" UI button may prompt the user to confirm the note removal. An example of such a confirmation dialog is illustrated in FIG. 6g, including the options to cancel or confirm the note removal.

Methodology

FIG. 7 illustrates a method for providing a scrapbook function in an electronic touch screen device, in accordance with an embodiment of the present invention. This example methodology may be implemented, for instance, by the UI module of the example touch screen device shown in FIG. 2a, or the example touch screen device shown in FIG. 2b (e.g., with the UI provisioned to the client by the server). To this end, the scrapbook function can be implemented in software, hardware, firmware, or any combination thereof, as will be appreciated in light of this disclosure.

As can be seen, the method generally includes sensing a user's input by a touch screen display. As soon as the user begins to swipe, drag or otherwise move a contact point, the UI code (and/or hardware) can assume a swipe gesture has been engaged and track the path of the contact point with respect to any fixed point within the touch screen until the user stops engaging the touch screen surface. The release point can also be captured by the UI as it may be used to commit the action started when the user pressed on the touch sensitive screen. In a similar fashion, if the user releases hold without moving the contact point, a tap or press or press-and-hold command may be assumed depending on the amount of time the user was continually pressing on the touch sensitive screen. These main detections can be used in various ways to implement UI functionality, including a scrapbook function as variously described herein, as will be appreciated in light of this disclosure.

In this example case, the method includes detecting 701 a user contact on the touch sensitive interface. As described above, the contact may be performed in any suitable manner using a stylus, the user's finger, or any other suitable implement, and it may be performed on a touch screen surface, a track pad, acoustic sensor, or other touch sensitive surface. The user contact monitoring is essentially continuous. Once a user contact has been detected, the method may continue with determining 702 whether a scrapbook creation mode has been invoked (e.g., based on type of gesture and/or location of gesture on touch screen, as previously explained). If the scrapbook creation mode is invoked, the method may continue with sampling 703 the content currently displayed on the device screen. Sampling the content on the screen may include sampling all of, or just a portion of the content being displayed to the user. In some embodiments, the scrapbook function is programmed or otherwise configured to take the entire page. In other cases, the user may be given an opportunity to select portions of a given page.

The method may continue with displaying 704 the content sample along with a scrapbook control menu. The content sample being displayed may appear with a torn edge, as if the page had been ripped from a physical magazine or catalogue, in some embodiments. The method may continue with determining 705 whether an existing scrapbook is selected from the scrapbook control menu. If an existing scrapbook is selected, the method may continue with adding 706 the content sample to the selected scrapbook. If an existing scrapbook is not selected from the scrapbook control menu, the method may continue with creating 707 a new scrapbook into which the content sample may be saved. In some embodiments the user may choose to create a new scrapbook for the sampled content by selecting a "new scrapbook" icon from the scrapbook control menu. The method may continue with displaying 708 a post-creation window or scrapbook creation notification which confirms to the user the creation of the new scrapbook. In some cases, tapping on the post-creation window may allow the user to jump to the newly created scrapbook.

If the scrapbook creation mode is not invoked at 702, the method may continue with determining 709 whether a scrapbook viewing mode is invoked. If a scrapbook viewing mode is not invoked, the contact may be reviewed 710 for some other UI request. If the scrapbook viewing mode is invoked, the method may continue with displaying 711 the selected scrapbook to the user and allowing user editing of the scrapbook. In some embodiments, the scrapbook may be displayed in an eReader application just as any eBook, magazine, or catalogue might be displayed, and editing the scrapbook may include adding or removing notes, or changing the order of the scrapbook pages.

Numerous variations and embodiments will be apparent in light of this disclosure. One example embodiment of the present invention provides a device including a touch screen display for displaying digital content to a user and allowing user input. The device also includes a user interface including a scrapbooking function having a scrapbook creation mode and a scrapbook viewing mode, wherein in response to a content sampling command, the scrapbook creation mode is configured to present a scrapbook control menu and a digital content sample selected from digital content displayed on the touch screen display, the scrapbook control menu allowing the user to add the digital content sample to a digital scrapbook, and wherein the scrapbook viewing mode is configured to allow the user to view and edit digital scrapbooks created with the scrapbook creation mode. In some cases, the content sampling command includes at least one of a two-contact downward swipe gesture, a two-contact upward swipe gesture, and/or selecting a scrapbook touch screen control feature. In some cases, the digital content sample includes metadata data present in the digital content displayed on the touch screen display, the metadata embedded within the sample. In some cases, the scrapbook control menu is configured to allow the user to create a new digital scrapbook. In some cases, the digital content sample is displayed with a torn edge. In some cases, the digital content sample includes a link to the digital content from which it is sampled. In some cases, the scrapbooking function is fully integrated within an eReader application. In some cases, the scrapbook creation mode allows the user to purchase a license if creating the digital content sample is otherwise not allowed. In some cases, the scrapbook creation mode is further configured to display a confirmation window when a digital content sample is added to a digital scrapbook. In some cases, the scrapbook viewing mode is further configured to allow the user to create, remove, and/or edit notes relating to the digital content sample. In some cases, the scrapbook viewing mode is further configured to allow the user to reorder the pages of a digital scrapbook. In some cases, a page of the digital scrapbook includes a plurality of digital content samples.

Another example embodiment of the present invention provides a mobile computing system including a processor and a touch screen display for displaying content to a user and allowing user input, and a user interface executable on the processor and including a scrapbooking function having a scrapbook creation mode and a scrapbook viewing mode, wherein in response to a content sampling command, the scrapbook creation mode is configured to present a scrapbook control menu and a digital content sample selected from digital content displayed on the touch screen display, the scrapbook control menu allowing the user to add the digital content sample to a digital scrapbook, and wherein the scrapbook viewing mode is configured to allow the user to view and edit digital scrapbooks created with the scrapbook creation mode. In some cases, the content sampling command includes at least one of a two-contact downward swipe gesture, a two-contact upward swipe gesture, and/or selecting a scrapbook touch screen control feature. In some cases, the digital content sample includes encrypted data present in the digital content from which it is sampled. In some cases, the scrapbook creation mode is further configured to display a confirmation window when a digital content sample is added to a digital scrapbook.

Another example embodiment of the present invention provides a computer program product including a plurality of instructions non-transiently encoded thereon to facilitate operation of an electronic device according to a process. The computer program product may include one or more computer readable mediums such as, for example, a hard drive, compact disk, memory stick, server, cache memory, register memory, random access memory, read only memory, flash memory, or any suitable non-transitory memory that is encoded with instructions that can be executed by one or more processors, or a plurality or combination of such memories. In this example embodiment, the process is configured to receive at the electronic device a content sampling command associated with digital content displayed on the electronic device, display on the electronic device a scrapbook control menu and a digital content sample selected from the digital content displayed on the electronic device, receive at the scrapbook control menu a command to add the digital content sample to a digital scrapbook, and save the digital content sample to the digital scrapbook. In some cases, the content sampling command includes at least one of a two-contact downward swipe gesture, a two-contact upward swipe gesture, and/or selecting a scrapbook touch screen control feature. In some cases, the digital content sample includes encrypted data present in the digital content from which it is sampled. In some cases, the process is further configured to display the contents of a digital scrapbook and allow editing of the digital scrapbook in response to a scrapbook viewing command.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A computer-implemented method comprising:
causing display of digital content on a touch sensitive display that forms part of an electronic device, wherein the digital content forms part of a content item that is accessible via the electronic device;
receiving, via the touch sensitive display while the digital content is being displayed thereon, a content sampling command, wherein the content sampling command comprises a swiping gesture that is detected on a region of the touch sensitive display where the digital content is displayed;

in response to receiving the content sampling command, causing display of a scrapbook control menu on the touch sensitive display, the scrapbook control menu including a listing of a plurality of digital scrapbooks, wherein the scrapbook control menu occupies a first portion of the touch sensitive display, and wherein the scrapbook control menu was not displayed before receiving the content sampling command;

further in response to receiving the content sampling command, causing display of a reduced size replication of the digital content on a second portion of the touch sensitive display that is not occupied by the scrapbook control menu;

receiving, via the scrapbook control menu, a scrapbook selection gesture that is associated with a selected one of the plurality of digital scrapbooks, wherein the selected digital scrapbook comprises a plurality of virtual pages arranged in a sequential order, wherein at least a portion of the virtual pages each comprises at least one content segment that is positioned on the virtual page according to a defined layout, wherein the scrapbook selection gesture comprises touching the selected digital scrapbook, and wherein the scrapbook selection gesture is received while the reduced size replication of the digital content remains displayed on the second portion of the touch sensitive display;

in response to receiving the scrapbook selection gesture, causing display of a first set of scrapbook page thumbnails, each of which corresponds to, and represents a visual layout of, one of the virtual pages of the selected digital scrapbook, wherein the first set of scrapbook page thumbnails is arranged according to the sequential order;

in response to receiving a scrolling gesture, causing display of a second set of scrapbook page thumbnails, each of which corresponds to one of the virtual pages of the selected digital scrapbook, wherein the second set of scrapbook page thumbnails is arranged according to the sequential order, wherein the scrolling gesture comprises touching an edge of the first set of scrapbook page thumbnails, and wherein the scrolling gesture is received while the reduced size replication of the digital content remains displayed on the second portion of the touch sensitive display;

receiving an insertion gesture that is associated with a particular scrapbook page thumbnail in the second set, wherein the insertion gesture is a touch release gesture, and wherein the insertion gesture is received while the reduced size replication of the digital content remains displayed on the second portion of the touch sensitive display; and in response to receiving the insertion gesture, adding the digital content to a particular virtual page that corresponds to the particular scrapbook page thumbnail;

wherein the scrapbook selection gesture, the scrolling gesture, and the insertion gesture collectively form part of a single touch-drag-release gesture performed on and detected by the touch sensitive display.

2. The method of claim 1, wherein the content sampling command comprises a single two-contact swipe gesture.

3. The method of claim 1, wherein the digital content includes metadata that is not displayed on the touch sensitive display.

4. The method of claim 1, wherein:
the digital content includes metadata that is not displayed on the touch sensitive display; and
adding the digital content to the particular virtual page includes associating the metadata with the particular virtual page.

5. The method of claim 1, wherein the scrapbook control menu further includes a user interface element associated with creation of a new digital scrapbook.

6. The method of claim 1, further comprising rendering the particular virtual page that includes the added digital content.

7. The method of claim 1, further comprising rendering the particular virtual page that includes the added digital content, wherein the added digital content is displayed with a torn edge.

8. The method of claim 1, further comprising rendering the particular virtual page that includes the added digital content, wherein the particular virtual page further includes a link to the content item.

9. The method of claim 1, further comprising generating an offer to purchase a license to add the digital content to the particular virtual page.

10. The method of claim 1, further comprising, in response to making a determination that a license to add the digital content to the particular virtual page is required, generating an offer to purchase the license.

11. The method of claim 1, further comprising causing display of a confirmation window in response to adding the digital content to the particular virtual page.

12. A non-transitory computer readable medium having instructions encoded thereon that, when executed by one or more processors, cause a digital scrapbooking process to be carried out, the process comprising:

causing display of digital content on a touch sensitive display that forms part of an electronic device, wherein the digital content forms part of a content item that is accessible via the electronic device;

receiving, via the touch sensitive display while the digital content is being displayed thereon, a content sampling command, wherein the content sampling command comprises a swiping gesture that is detected on a region of the touch sensitive display where the digital content is displayed;

in response to receiving the content sampling command, causing display of a scrapbook control menu on the touch sensitive display, the scrapbook control menu including a listing of a plurality of digital scrapbooks, wherein the scrapbook control menu occupies a first portion of the touch sensitive display, and wherein the scrapbook control menu was not displayed before receiving the content sampling command;

further in response to receiving the content sampling command, causing display of a reduced size replication of the digital content on a second portion of the touch sensitive display that is not occupied by the scrapbook control menu;

receiving, via the scrapbook control menu, a scrapbook selection gesture that is associated with a selected one of the plurality of digital scrapbooks, wherein the selected digital scrapbook comprises a plurality of virtual pages arranged in a sequential order, wherein at least a portion of the virtual pages each comprises at least one content segment that is positioned on the virtual page according to a defined layout, wherein the scrapbook selection gesture comprises touching the selected digital scrapbook, and wherein the scrapbook selection gesture is received while the reduced size replication of the digital content remains displayed on the second portion of the touch sensitive display;

in response to receiving the scrapbook selection gesture, causing display of a first set of scrapbook page thumbnails, each of which corresponds to, and represents a visual layout of, one of the virtual pages of the selected digital scrapbook, wherein the first set of scrapbook page thumbnails is arranged according to the sequential order;

in response to receiving a scrolling gesture, causing display of a second set of scrapbook page thumbnails, each of which corresponds to one of the virtual pages of the selected digital scrapbook, wherein the second set of scrapbook page thumbnails is arranged according to the sequential order, wherein the scrolling gesture comprises touching an edge of the first set of scrapbook page thumbnails, and wherein the scrolling gesture is received while the reduced size replication of the digital content remains displayed on the second portion of the touch sensitive display;

receiving an insertion gesture that is associated with a particular scrapbook page thumbnail in the second set, wherein the insertion gesture is a touch release gesture, and wherein the insertion gesture is received while the reduced size replication of the digital content remains displayed on the second portion of the touch sensitive display; and in response to receiving the insertion gesture, adding the digital content to a particular virtual page that corresponds to the particular scrapbook page thumbnail;

wherein the scrapbook selection gesture, the scrolling gesture, and the insertion gesture collectively form part of a single touch-drag-release gesture performed on and detected by the touch sensitive display.

13. The non-transitory computer readable medium of claim 12, wherein the content sampling command comprises at least one of a two-contact downward swipe gesture, a two-contact upward swipe gesture, and selection of a scrapbook control feature.

14. The non-transitory computer readable medium of claim 12, wherein the digital content includes encrypted data.

15. The non-transitory computer readable medium of claim 12, wherein the process further comprises rendering, using the touch sensitive display, the particular virtual page that includes the added digital content.

16. The non-transitory computer readable medium of claim 12, wherein the process further comprises, in response to making a determination that a license to add the digital content to the particular virtual page is required, generating an offer to purchase the license.

17. A digital scrapbooking system comprising:
an electronic device;
a touch sensitive display that forms part of the electronic device;
a memory device; and
a processor that is operatively coupled to the touch sensitive display and the memory device, wherein the processor is configured to execute instructions stored in the memory device that, when executed, cause the processor to carry out a digital scrapbooking process that comprises:
causing display of digital content on the touch sensitive display, wherein the digital content forms part of a content item that is accessible via the electronic device;
receiving, via the touch sensitive display while the digital content is being displayed thereon, a content sampling command, wherein the content sampling command comprises a swiping gesture that is detected on a region of the touch sensitive display where the digital content is displayed;

in response to receiving the content sampling command, causing display of a scrapbook control menu on the touch sensitive display, the scrapbook control menu including a listing of a plurality of digital scrapbooks, wherein the scrapbook control menu occupies a first portion of the touch sensitive display, and wherein the scrapbook control menu was not displayed before receiving the content sampling command;

further in response to receiving the content sampling command, causing display of a reduced size replication of the digital content on a second portion of the touch sensitive display that is not occupied by the scrapbook control menu, wherein the scrapbook control menu and the reduced size replication are displayed simultaneously;

receiving, via the scrapbook control menu, a scrapbook selection gesture that is associated with a selected one of the plurality of digital scrapbooks, wherein the selected digital scrapbook comprises a plurality of virtual pages arranged in a sequential order, wherein at least a portion of the virtual pages each comprises at least one content segment that is positioned on the virtual page according to a defined layout, wherein the scrapbook selection gesture comprises touching the selected digital scrapbook, and wherein the scrapbook selection gesture is received while the reduced size replication of the digital content remains displayed on the second portion of the touch sensitive display;

in response to receiving the scrapbook selection gesture, causing display of a first set of scrapbook page thumbnails, each of which corresponds to, and represents a visual layout of, one of the virtual pages of the selected digital scrapbook, wherein the first set of scrapbook page thumbnails is arranged according to the sequential order;

in response to receiving a scrolling gesture, causing display of a second set of scrapbook page thumbnails, each of which corresponds to one of the virtual pages of the selected digital scrapbook, wherein the second set of scrapbook page thumbnails is arranged according to the sequential order, wherein the scrolling gesture comprises touching an edge of the first set of scrapbook page thumbnails, and wherein the scrolling gesture is received while the reduced size replication of the digital content remains displayed on the second portion of the touch sensitive display;

receiving an insertion gesture that is associated with a particular scrapbook page thumbnail in the second set, wherein the insertion gesture is a touch release gesture, and wherein the insertion gesture is received while the reduced size replication of the digital content remains displayed on the second portion of the touch sensitive display; and in response to receiving the insertion gesture, adding the digital content to a particular virtual page that corresponds to the particular scrapbook page thumbnail;

wherein all of the digital content that was displayed on the touch sensitive display when the content sampling command was received is added to the particular virtual page; and wherein the scrapbook selection gesture, the scrolling gesture, and the insertion gesture collectively form part of a single touch-drag-release gesture performed on and detected by the touch sensitive display.

18. The digital scrapbooking system of claim 17, wherein the digital content includes metadata that is not displayed on the touch sensitive display.

19. The digital scrapbooking system of claim 17, wherein the scrapbook control menu further includes a user interface element associated with creation of a new digital scrapbook.

20. The digital scrapbooking system of claim 17, wherein the digital scrapbooking process further comprises causing display of a confirmation window in response to adding the digital content to the particular virtual page.

\* \* \* \* \*